(12) United States Patent
Nohmi

(10) Patent No.: US 11,975,225 B2
(45) Date of Patent: May 7, 2024

(54) DRONE SYSTEM

(71) Applicant: Ebara Corporation, Tokyo (JP)

(72) Inventor: Motohiko Nohmi, Tokyo (JP)

(73) Assignee: Ebara Corporation, Tokyo (JP)

( * ) Notice: Subject to any disclaimer, the term of this patent is extended or adjusted under 35 U.S.C. 154(b) by 365 days.

(21) Appl. No.: 17/431,612

(22) PCT Filed: Aug. 23, 2019

(86) PCT No.: PCT/JP2019/033102
§ 371 (c)(1),
(2) Date: Aug. 17, 2021

(87) PCT Pub. No.: WO2020/170479
PCT Pub. Date: Aug. 27, 2020

(65) Prior Publication Data
US 2022/0023685 A1 Jan. 27, 2022

(30) Foreign Application Priority Data
Feb. 20, 2019 (JP) ................. 2019-028534

(51) Int. Cl.
*B64C 39/02* (2023.01)
*A62C 3/02* (2006.01)
(Continued)

(52) U.S. Cl.
CPC .......... *A62C 3/0228* (2013.01); *B64C 39/022* (2013.01); *B64F 3/02* (2013.01);
(Continued)

(58) Field of Classification Search
CPC .... A63C 3/0228; B64C 39/022; B64U 10/60; B64U 50/19; B64U 2101/45; B64U 2101/47
See application file for complete search history.

(56) References Cited

U.S. PATENT DOCUMENTS 3,759,330 A 9/1973 Rainey
9,764,839 B2 * 9/2017 Whitaker .................. B64F 3/02
(Continued)

FOREIGN PATENT DOCUMENTS

JP 2011-188975 A 9/2011
JP 2019-083829 A 6/2019
(Continued)

OTHER PUBLICATIONS

Japan Patent Office, International Search Report in International Application No. PCT/JP2019/033102 (dated Nov. 12, 2019).

*Primary Examiner* — Philip J Bonzell
(74) *Attorney, Agent, or Firm* — Leydig, Voit & Mayer Ltd.

(57) ABSTRACT

The present invention relates a drone system for transporting liquid or gas from a remote area to a demand area. The drone system (100) includes: a transport pipe (10) for flowing the liquid or the gas; a pump device (201) for suppling the liquid or the gas to the transport pipe (10); a top drone (1) for holding a nozzle (11) coupled to a tip end of the transport pipe (10); a plurality of pump drones (6A, 6B), each of which incorporates a pump (40A, 40B); and a power supply unit (3) for suppling a power to the top drone (1) and the pump drones (6A, 6B) through power cables (5). Each of the pump drones (6A, 6B) has a coupling mechanism (35) for tiltably and rotatably coupling the pump (40A, 40B) to a pump drone body (30).

2 Claims, 33 Drawing Sheets

(51) Int. Cl.
*B64F 3/02* (2006.01)
*B64D 47/08* (2006.01)
*B64U 50/19* (2023.01)
*B64U 101/60* (2023.01)

(52) U.S. Cl.
CPC ............. *B64D 47/08* (2013.01); *B64U 50/19* (2023.01); *B64U 2101/60* (2023.01)

(56) References Cited

U.S. PATENT DOCUMENTS

| | | | |
|---|---|---|---|
| 11,040,773 B2* | 6/2021 | Furukawa | B65H 75/4484 |
| 11,679,873 B2* | 6/2023 | Suefuku | G05D 1/104 |
| | | | 244/4 R |
| 2016/0318607 A1* | 11/2016 | Desai | B64D 1/16 |
| 2017/0043872 A1 | 2/2017 | Whitaker | |
| 2019/0106212 A1* | 4/2019 | Furukawa | B64C 39/024 |
| 2019/0160315 A1* | 5/2019 | Head | G05D 1/0094 |
| 2020/0216173 A1* | 7/2020 | Suefuku | A62C 29/00 |
| 2021/0138281 A1* | 5/2021 | Nohmi | B64U 50/31 |
| 2023/0312093 A1* | 10/2023 | Suefuku | A47L 11/38 |
| | | | 244/4 R |

FOREIGN PATENT DOCUMENTS

| | | | |
|---|---|---|---|
| WO | WO 2016/016880 A1 | 2/2016 | |
| WO | WO 2017/094842 A1 | 12/2016 | |
| WO | WO 2018/046973 A2 | 3/2018 | |
| WO | WO-2019208440 A1 * | 10/2019 | ........... A62C 3/0242 |

* cited by examiner

DRONE SYSTEM

CROSS-REFERENCE TO RELATED APPLICATIONS

This patent application is the U.S. national phase of International Application No. PCT/JP2019/033102, filed Aug. 23, 2019, which claims the benefit of Japanese Patent Application No. 2019-028534, filed on Feb. 20, 2019, which are incorporated by reference in their entireties herein.

TECHNICAL FIELD

The present invention relates to a drone system that uses a plurality of drones to transport liquid (e.g., water, firefighting fluid, or liquid fuel), or gas (e.g., fuel gas, such as propane gas, and hydrogen gas) from a remote area to a demand area.

BACKGROUND ART

In recent years, there have been many large-scale natural disasters, such as major earthquakes, landslides triggered by torrential downpour, and wildfires caused by dry weather. When such natural disasters occur, lifeline facilities, such as water pipes, gas pipes, and electric lines, are destroyed, causing water supply cuts, fuel gas interruptions, and power outages in the affected areas. Further, if roads are cut off due to major earthquakes or landslides, special-purpose vehicles, such as fire trucks, ambulances, and rescue vehicles, cannot reach demand area, i.e., disaster area. Lifeline facilities, such as water pipes, gas pipes, and electric lines, are indispensable for human life. In particular, water is an essential substance for sustaining human life. Therefore, it is necessary to restore lifeline facilities quickly. However, in reality, it often takes a long time to restore lifeline facilities.

Conventionally, water, liquid fuel, fuel gas, and daily necessities such as food are transported to the disaster area (i.e., the demand area) using aircraft such as helicopter, and light aircraft, until lifeline facilities and/or disrupted roads in the disaster area are restored. In this case, water, liquid fuel, and fuel gas cannot be continuously supplied to the disaster area, and thus there is a risk of not being able to supply sufficient amounts of water, liquid fuel, and fuel gas to the disaster area.

When a wildfire occurs, it is difficult for fire trucks to reach fire sites, and further, water source necessary for extinguishing the wildfire often does not exist near the fire sites. For this reason, aircraft, such as helicopter, and light aircraft, are often used in the event of a wildfire. Specifically, firefighters store firefighting fluid (e.g., water) in large containers suspended from the aircraft, and spray the fluid from above the fire site. The aircraft shuttles back and forth between the source of the firefighting fluid, such as a lake, and the fire site (i.e., the demand area) until the wildfire is extinguished. In this case, too, it is difficult to secure a sufficient amount of firefighting fluid for fire-fighting activities because it cannot be continuously supplied to the wildfire site.

If roads in a city are destroyed by earthquake, fire trucks may not be able to reach fire sites occurring in the city. In a case where, even though fire trucks can reach the fire sites, water pipes and/or power lines are cut off by earthquake, adequate firefighting activities may be hindered or cannot be performed.

A drone, defined as an unmanned mobile which can move in the air or in the water or in both areas, is widely used in various fields, such as photographing or monitoring, checking or inspecting, or measuring. The drone moves autonomously according to a preset object, is maneuvered using a wireless means (one of radio wave, visible light, laser beams of every wavelength range, sonic wave, and ultrasonic wave, or any combination thereof) by a human operator, or is controlled wirelessly by an external controller (including a computer).

From this viewpoint, a research is being conducted on a drone system, in which a plurality of drones connected in series through power cables suspend a transport pipe for flowing liquid, such as water, extinguishing fluid, or liquid fuel, or gas such as fuel gas flow, and then liquid or gas are supplied to the demand area (e.g., disaster area) through the transport pipe. According to this drone system, there is no restriction on flight time of the plurality of drones because each drone is constantly supplied with electric power from the power cables. Therefore, liquid or gas can be continuously supplied to the demand area. Furthermore, as long as electric power is continuously supplied from a top drone, which is located at the uppermost (top) side of the plurality of drones, to a battery placed at the demand area, electric power can be used freely at the demand area.

CITATION LIST

Patent Literature

Patent document 1: International Patent Publication No. WO 2017/094842

SUMMARY OF INVENTION

Technical Problem

However, areas capable of supplying liquid or gas to the demand area, such as the disaster area, are often remote areas far from the demand area. Furthermore, in the case of wildfire, areas capable of continuously supply the firefighting fluids to the fire site are assumed to be urban areas far away from the fire site. This means that the liquid or gas supply system (e.g., pump system) is required to be disposed in the remote area far from the demand area. Accordingly, in order to stably deliver liquid or gas from the remote area to the demand area using the plurality of drones, a plurality of pumps for increasing a pressure of liquid or gas is necessary to be disposed in the middle of the transport pipe.

Furthermore, there may be natural objects (e.g., trees, rocks, cliffs, and mountains), or man-made objects (e.g., houses, buildings, bridges, and power lines) between the remote area and the demand area. Therefore, in order to prevent the transport pipes from contacting these objects, it is necessary to increase a freedom of movement of each drone with respect to the transport pipes, and allow the transport pipes to bend freely to some extent.

It is therefore an object of the present invention to provide a drone system capable of continuously supplying liquid or gas from a remote area to a demand area.

Solution to Problem

In an embodiment, there is provided a drone system for suppling liquid or gas from a remote area to a demand area, comprising: a transport pipe for flowing the liquid or the gas; a pump device located at the remote area to supply the liquid or the gas to the transport pipe; a top drone for holding a nozzle coupled to a tip end of the transport pipe; a plurality of pump drones which are located in the middle of the transport pipe, and each of which incorporates a pump for increasing a pressure of the liquid or the gas flowing through the transport pipe; and a power supply unit for suppling a power to the top drone and the plurality of pump drones through power cables; wherein the transport pipe is formed by coupling a plurality of conduits through pumps of the pump drones, each of the pump drones has: a pump drone body; and a coupling mechanism for tiltably and rotatably coupling the pump to the pump drone body.

In an embodiment, an inlet pipe and a discharge pipe of the pump are coupled to the conduits through swivel joints, respectively.

In an embodiment, the coupling mechanism includes: a coupling shaft fixed to the pump; and a rotating member for rotatably supporting the pump around the coupling shaft; and the rotating member is rotatably supported by the pump drone body.

In an embodiment, the coupling mechanism is constructed of a rotating member which is rotatably supported by the pump drone body, and a plurality of spring members extending from the rotating member to the pump.

In an embodiment, the coupling mechanism is constructed of a plurality of spring members extending from a wall surface of a through-hole, formed in the pump drone body, to the pump.

In an embodiment, the coupling mechanism includes: a rotating member which is rotatably supported by the pump drone body; a support structure coupled to the rotating member; a first coupling shaft for coupling the rotating member to the support structure; and a second coupling shaft for coupling the support structure to the pump, the support structure is supported by the rotating member such that the support structure can be rotated around the first coupling shaft, and the pump is supported by the support structurer such that the pump can be rotated around the second coupling shaft.

In an embodiment, the pump drone body includes a disk rotatably supported by a through-hole formed in the pump drone body, and a structure fixed to the disk, and the coupling mechanism is disposed in the structure.

In an embodiment, the coupling mechanism includes: a bearing fixed to the pump drone body; and a rotation shaft rotatably supported by the bearing, the rotation shaft has a main shaft which is supported by the bearing, and a first branch shaft and a second branch shaft which branch off from the main shaft, and the pump has bearings which rotatably support a tip end of the first branch shaft and a tip end of the second branch shaft of the rotation shaft, respectively.

In an embodiment, the pump drone further includes a balance mechanism that generates a force counteracting a force that acts on the pump drone body in the opposite direction of the flow direction of the liquid or the gas generated by driving the pump. In an embodiment, the balance mechanism includes: an arm extending from the pump drone body; and a rotary blade mounted to the arm.

In an embodiment, the drone system further comprises a swivel joint mechanism including a plurality of swivel joints, wherein adjacent conduits are coupled to each other by the swivel joint mechanism.

In an embodiment, the top drone includes: a top drone body; a bearing mounted to the top drone body; a nozzle rotation shaft rotatably supported by the bearing; an actuator for rotating the nozzle with respect to the nozzle rotation shaft.

In an embodiment, the top drone further includes a short pipe coupled to a tip end of the transport pipe, the nozzle is coupled to a tip end of the short pipe through a swivel joint, the nozzle rotation shaft has a main shaft rotatably supported by the bearing, and a first branch shaft and a second branch shaft which branch off from the main shaft, a tip end of the first branch shaft of the nozzle rotation shaft is fixed to the short pipe, and a tip end of the second branch shaft of the nozzle rotation shaft is coupled to the nozzle through the actuator.

In an embodiment, the top drone further includes a locking mechanism for restricting rotation of the nozzle rotation shaft with respect to the bearing.

In an embodiment, the power cable is fixed to an outer surface of the conduit.

In an embodiment, the drone system further comprises a coupling drone for coupling adjacent conduits to each other.

In an embodiment, the coupling drone includes: a coupling drone body; a short pipe disposed inside a through-hole provided in the coupling drone body; a sleeve fixed to an outer surface of the short pipe; and a damper mechanism for coupling a wall surface of the through-hole and an outer surface of the sleeve, and the adjacent conduits are coupled to both ends of the short pipe, respectively.

In an embodiment, the coupling drone further includes swivel joints disposed in both ends of the short pipe, respectively.

In an embodiment, the coupling drone includes: a coupling drone body; a bearing mounted to the coupling drone body; a support shaft rotatably supported by the bearing; and a coupling pipe supported by the support shaft, the support shaft has a main shaft rotatably supported by the bearing, and a first branch shaft and a second branch shaft which branch off from the main shaft, and have an approximate C-shape, respectively, the coupling pipe has a first bent pipe and a second bent pipe, each of which is bent in an approximate L-shape, and a swivel joint coupling the first bent pipe and the second bent pipe to each other, an actuator for rotating the first bent pipe with respect to the second bent pipe is fixed to a terminal end of the first branch shaft of the support shaft, an actuator for rotating the second bent pipe with respect to the first bent pipe is fixed to a terminal end of the second branch shaft of the support shaft, and the adjacent conduits are coupled to both ends of the coupling pipe, respectively.

In an embodiment, the coupling drone includes: a coupling drone body; a bearing mounted to the coupling drone body; a support shaft rotatably supported by the support shaft; and a coupling pipe supported by the support shaft, the support shaft has a main shaft rotatably supported by the bearing, and a frame connected to a terminal end of the main shaft, and having an approximate C-shape, the coupling pipe has a first bent pipe and a second bent pipe, each of which is bent in an approximate L-shape, and a swivel joint coupling the first bent pipe and the second bent pipe to each other, an actuator for rotating the first bent pipe with respect to the second bent pipe is fixed to one end of the frame, an actuator for rotating the second bent pipe with respect to the first bent pipe is fixed to a terminal end of the second branch shaft of the support shaft, and the adjacent conduits are coupled to both ends of the coupling pipe, respectively.

In an embodiment, the top drone has an imaging device and/or an infrared camera fixed to the nozzle.

In an embodiment, the top drone has a connector which can connect a battery located at the demand area.

Advantageous Effects of Invention

According to the present invention, the top drone and each pump drone are constantly supplied with electric power from the power supply unit through the power cable, and thus the top drone and each pump drone have no restrictions on flight time. In other words, the top drone and each pump drone can continue to fly. Furthermore, each pump drone can be rotated and/or tilted with respect to the transport pipe by the coupling mechanism, so the transport pipe can be bent like a multijointed robot arm with each pump drone as the fulcrum. Therefore, even though there are various obstacles (e.g., natural objects, such as trees, rocks, cliffs, and mountains, as well as man-made objects, such as houses, buildings, bridges, and power lines) between the remote area and the demand area, the top drone holding the nozzle fixed at a tip end of the transport pipe can be reached to the demand area. As a result, liquid or gas jetted from the nozzle can be continuously supplied to the demand area.

DESCRIPTION OF EMBODIMENTS

Figure 1:
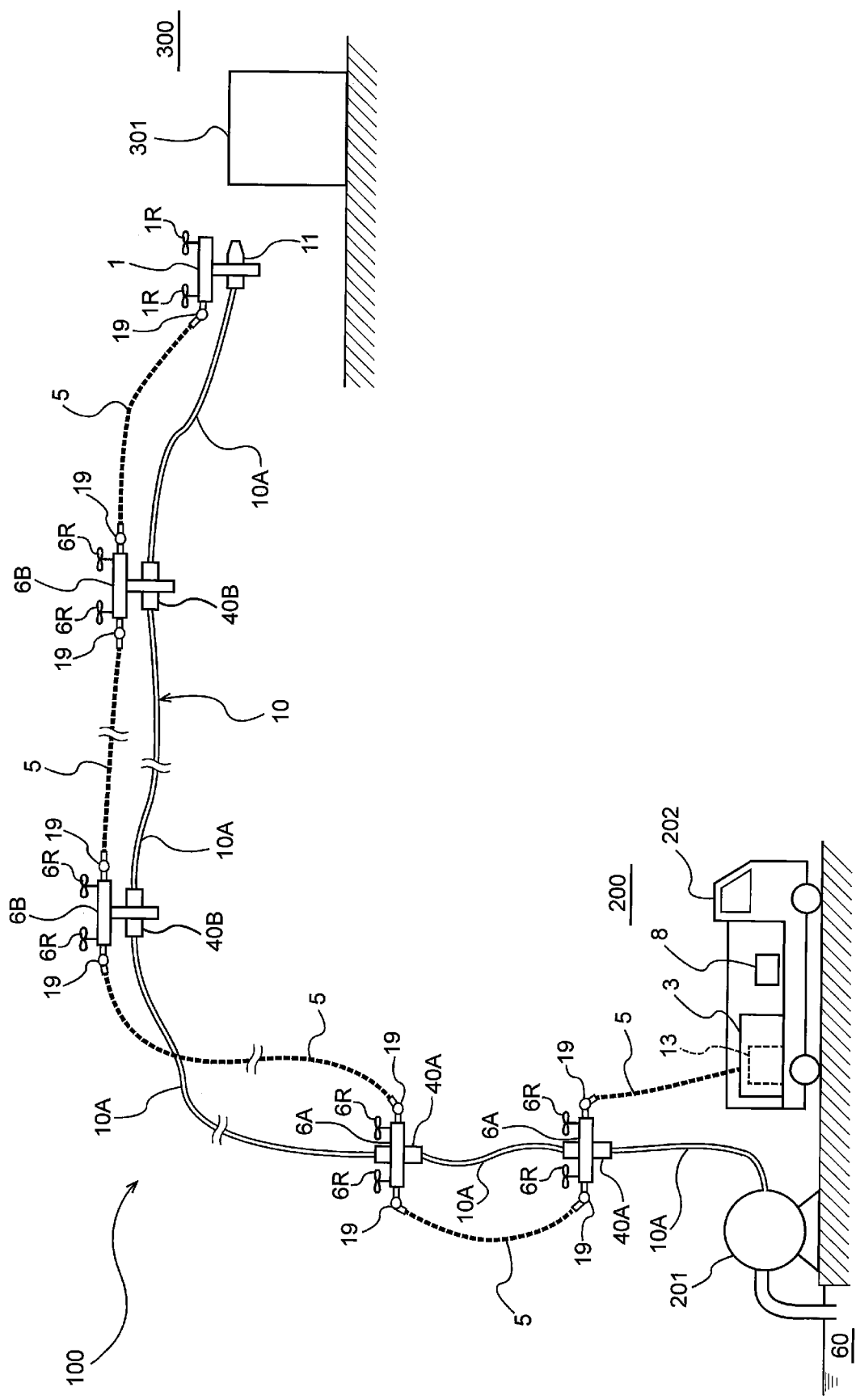
FIG. 1 is a schematic view showing a drone system according to an embodiment.

Embodiments will be described with reference to the drawings. In the drawings described below, the same or corresponding components are designated by the same reference numerals, and duplicate description will be omitted.

FIG. 1 is a schematic view showing a drone system according to an embodiment. The drone system 100 shown in FIG. 1 is a system for supplying water, which is an example of liquid, from a remote area 200 to a tank 301 disposed in a disaster area 300, which is an example of a demand area.

As shown in FIG. 1, the drone system 100 includes a transport pipe 10 formed by coupling a plurality of conduits 10A for flowing water, a pump device (supply unit) 201 coupled to a terminal end of the transport pipe 10, a plurality of drones 1, 6A, 6B coupled in series through power cables 5, and a power supply unit 3 that supplies power for flying the plurality of drones 1, 6A, 6B to the plurality of drones 1, 6A, 6B through the power cables 5. In FIG. 1, the power cables 5 are illustrated by thick dotted line.

In this embodiment, the plurality of drones includes a top drone 1 holding a nozzle 11 connected to a tip end of the transport pipe 10, and a plurality of (in the illustrated example, four) pump drones 6A, 6B disposed in the middle of the transport pipe 10. The top drone 1 and the pump drones 6A, 6B are coupled in series through the power cables 5. In other words, the top drone 1 and the pump drones 6A, 6B are coupled in a chain-like manner by the plurality of power cables 5.

Each pump drone 6A has a pump 40A for increasing a pressure of water flowing through the transport pipe 10 that extends in an approximate vertical direction, and each pump drone 6B has a pump 40B for increasing a pressure of water flowing through the transport pipe 10 that extends in an approximate horizontal direction. In the following, the pump drone 6A may be referred to as a "vertical pump drone 6A" and the pump drone 6B may be referred to as a "horizontal pump drone 6B".

The transport pipe 10 is formed by coupling the plurality of conduits 10A with one another. In this embodiment, the adjacent conduits 10A are coupled through a pump 40A of the vertical pump drone 6A, or a pump 40B of the horizontal pump drone 6B. More specifically, one end (tip end) of the conduit 10A is coupled to an inlet pipe of the pump 40A of the vertical pump drone 6A, or an inlet pipe of the pump 40B of the horizontal pump drone 6B, and the other end (terminal end) of the conduit 10A is coupled to a discharge pipe of the pump 40A of the vertical pump drone 6A, or a discharge pipe of the pump 40B of the horizontal pump drone 6B. A terminal end of the conduit 10A, which is located at the lowermost side, is coupled to the pump device 201, and the nozzle 11 coupled to the tip end of the conduit 10A, which is located at the uppermost side, is held by the top drone 1. A pressure of the water supplied from the pump device 201 to the transport pipe 10 and flowing through the transport pipe 10 is increased by the pump 40A or pump 40B disposed in the middle of the transport pipe 10, and water having a desired pressure is discharged from the nozzle 11.

The power supply unit 3 shown in FIG. 1 includes a power source 13. The type of this power source 13 is freely-selected, and any kind of power source, for example, a battery, a storage battery, a condenser, and a fuel cell can be installed in the power supply unit 3. In one embodiment, a commercial power supply (not shown) may be connected to the power supply unit 3. In this case, power supplied from the commercial power supply is supplied to the top drone 1 and each of the pump drones 6A, 6B through the power supply unit 3 and the power cables 5. Alternatively, a power-generating unit (not shown) may be installed, from which power may be supplied to the power supply unit 3. In one embodiment, the power generating unit itself may serve as the power supply unit 3.

Further, the drone system 100 has a controller 8 configured to control operations of the top drone 1 and each of the pump drones 6A, 6B, and operations of the power supply unit 3. The controller 8 may be a controller maneuvered by a human operator, or a computer storing a program for controlling the operations of the top drone 1 and each of the pump drones 6A, 6B. The top drone 1 and each of the pump drones 6A, 6B operates wirelessly based on control signals transmitted from the controller 8. In one embodiment, the controller 8 may transmit the control signals to the top drone 1 and each of the pump drones 6A, 6B through the power cables 5. In the illustrated example, both the power supply unit 3 and the controller 8 is housed in a vehicle 202. However, the present embodiment is not limited to this example. For example, the vehicle 202 may be omitted, and each of the power supply unit 3 and the controller 8 may be placed on the ground at the remote area 200. Alternatively, one of the power supply unit 3 and the controller 8 may be housed in the vehicle 202, and the other may be placed on the ground at the remote area 200.

The top drone 1 has a plurality of rotary blades 1R, and the plurality of rotary blades 1R serve as a thrust generation mechanism to generate thrust for flying the top drone 1. Each of the pump drones 6A, 6B also has a plurality of rotary blades 6R, and the plurality of rotary blades 6R serve as a thrust generation mechanism to generate thrust for flying the pomp drones 6A, 6B. The plurality of drones 1, 6A, 6B are flown, the transport pipe 10 is suspended by the plurality of drones 1, 6A, 6B.

In this embodiment, the pump device 201 pumps water, stored in the reservoir 60, directly into the transport pipe 10. In one embodiment, the pump device 201 may be coupled to a fire hydrant or water pipe (each of which is not shown). Alternatively, the pump device 201 may be connected to a water source, such as a fire hydrant or water pipe, through a water storage tank (not shown). In this case, water is supplied from the water source to the water storage tank, and thus the pump device 201 pumps the water, stored in the water storage tank, to the transport pipe 10.

Figure 2:
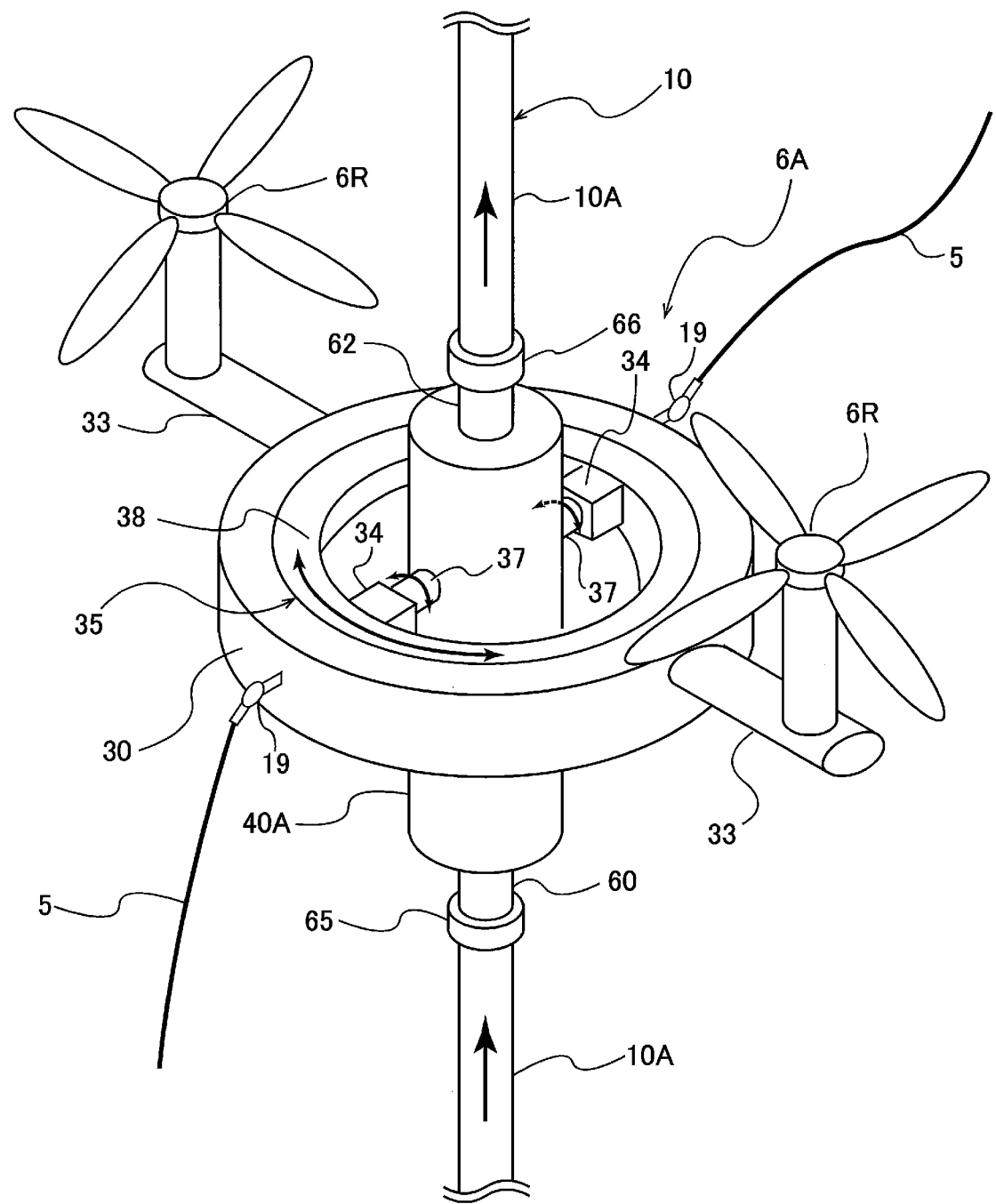
FIG. 2 is a perspective view schematically showing a vertical pump drone according to one embodiment.

FIG. 2 is a perspective view schematically showing the vertical pump drone 6A according to one embodiment. The vertical pump drone 6A shown in FIG. 2 has the plurality of (in the illustrated example, two) rotary blades 6R, the pump 40A, a pump drone body 30 having a ring shape, and a coupling mechanism 35 for tiltably and rotatably coupling the pump 40A to the pump drone body 30. The pump 40A and the coupling mechanism 35 are located inside the pump drone body 30.

Each rotary blade 6R is attached to the tip of an arm 33 which protrudes from an outer surface of the pump drone body 30. The pump 40A is coupled to the pump drone body 30 through the coupling mechanism 35 so that the conduit 10A (i.e., transport pipe 10) coupled to the pump 40A extends in an approximate vertical direction.

In this embodiment, the coupling mechanism 35 includes coupling shafts 37 fixed to the pump 40A, and a rotating member 38 for rotatably supporting the coupling shafts 37. The rotating member 38 has a ring-like shape, and is rotatably supported by the pump drone body 30. More specifically, an outer surface of the rotating member 38 is rotatably supported on a wall surface of a through-hole formed in the pump drone body 30. The coupling shafts 37 extend from an outer surface of the pump 40A to an inner surface of the rotating member 38, respectively, and are rotatably supported by bearings 34, each of which is fixed to the inner surface of the rotating member 38. In other words, the pump 40A and the transport pipe 10 coupled to the pump 40A can be rotated with respect to the pump drone body 30 through the coupling shaft 37 and the rotating member 38, and can be tilted with respect to the pump drone body 30, supporting the rotating member 38, through the coupling shaft 37. With this configuration, the pump 40A is rotatably and tiltably supported by the pump drone body 30, increasing the degree of freedom of operation of the pump drone 6A with respect to the transport pipe 10 coupled to the pump 40A.

As shown in FIG. 2, an inlet pipe 60 of the pump 40A may be coupled to the terminal end of the conduit 10A through a swivel joint 65. Further, a discharge pipe 62 of the pump 40A may be coupled to the tip end of the conduit 10A through a swivel joint 66. The swivel joints 65, 66 allow the vertical pump drone 6A in the entirety to be rotated with respect to the conduits 10A. Therefore, the swivel joints 65, 66 eliminate twists in the conduit 10A with respect to the vertical pump drone 6A, further increasing the freedom of movement of the vertical pump drone 6A with respect to the conduit 10A (i.e., the transport pipe 10).

In the embodiment shown in FIG. 2, the power cable 5 is coupled to the vertical pump drone 6A through a universal joint 19. The universal joint 19 is fixed to the pump drone body 30 of the vertical pump drone 6A. The electric power which has supplied to the drone body 30 through the power cable 5 and the universal joint 19 is supplied to the rotary blades 6R and the pump 40A through the power line (not shown), and is used to operate the rotary blades 6R and the pump 40A.

Figure 3:
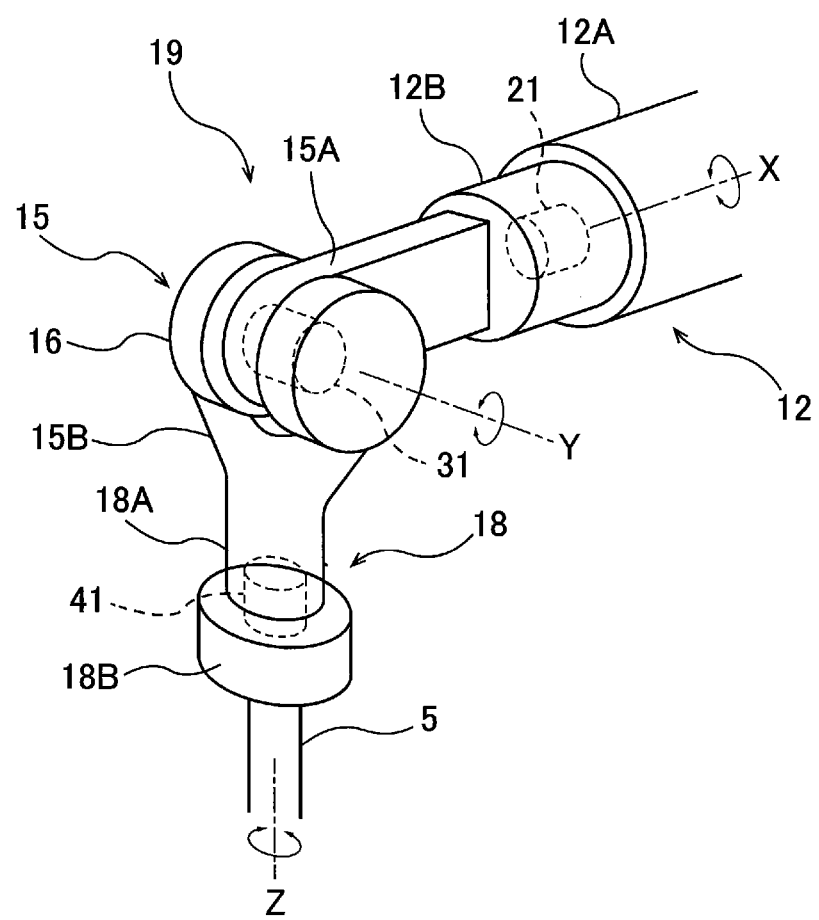
FIG. 3 is a schematic view showing an example of a universal joint.

FIG. 3 is a schematic view showing an example of the universal joint 19. The universal joint 19 has an X-axis rotary joint 12 that can rotate around an X-axis, a Y-axis rotary joint 15 that can rotate around a Y-axis, and a Z-axis rotary joint 18 that can rotate around a Z-axis. The X-axis rotary joint 12 is coupled to the drone body 30 of the vertical pump drone 6A, the Y-axis rotary joint 15 is coupled to the X-axis rotary joint 12, and the Z-axis rotary joint 18 is coupled to the Y-axis rotary joint 15 and the power cable 5. The X-axis rotary joint 12 has a first X-axis shaft 12A fixed to the pump drone body 30, and a second X-axis shaft 12B connected coaxially to the first X-axis shaft 12A. Central axes of the first X-axis shaft 12A and the second X-axis shaft 12B coincide with the X-axis, and the first X-axis shaft 12A and the second X-axis shaft 12B are rotatable relative to each other around the X-axis.

The Y-axis rotary joint 15 has a first Y-axis shaft 15A connected to the second X-axis shaft 12B, and a second Y-axis shaft 15B rotatably coupled to the first Y-axis shaft 15A. The first Y-axis shaft 15A may be integral with the second X-axis shaft 12B, or may be formed as a separate member that is different from the second X-axis shaft. The first Y-axis shaft 15A and the second Y-axis shaft 15B are rotatably coupled to each other by a pivot shaft 16. An axis center of this pivot shaft 16 coincides with the Y-axis. Therefore, the first Y-axis shaft 15A and the second Y-axis shaft 15B are rotatable relative to each other around the Y-axis.

The Z-axis rotary joint 18 has a first Z-axis shaft 18A connected to the second Y-axis shaft 15B, and a second Z-axis shaft 18B coupled coaxially to the first Z-axis shaft 18A. The first Z-axis shaft 18A may be integral with the second Y-axis shaft 15B, or may be formed as a separate member that is different from the second Y-axis shaft. Central axes of the first Z-axis shaft 18A and the second Z-axis shaft 18B coincide with the Z-axis, and the first Z-axis shaft 18A and the second Z-axis shaft 18B are rotatable relative to each other around the Z-axis. The power cable 5 is connected to the second Z-axis shaft 18B, and can rotate around the Z-axis.

The X-axis, which is the rotational axis center of the X-axis rotary joint 12, is perpendicular to the Y-axis, which is the rotational axis center of the Y-axis rotary joint 15, and the Y-axis is perpendicular to the Z-axis, which is the rotational axis center of the Z-axis rotary joint 18. Therefore, the universal joint 19 with X-axis rotation joint 12, Y-axis rotation joint 15, and Z-axis rotation joint 18 allows free rotation and free tilt of the vertical pump drone 6A relative to the power cable 5. This allows the vertical pump drone 6A to maintain a stable posture in the air and to fly stably.

The universal joint 19 is further provided with an X-axis rotational connector 21, a Y-axis rotational connector 31, and a Z-axis rotational connector 41 disposed therein. The X-axis rotational connector 21 is disposed in the X-axis rotational joint 12, the Y-axis rotational connector 31 is disposed in the Y-axis rotational joint 15, and the Z-axis rotational connector 41 is disposed in the Z-axis rotational joint 18. The X-axis rotary connector 21, the Y-axis rotary connector 31, and the Z-axis rotary connector 41 are electrically connected to both the power cable 5 and the vertical pump drone 6A. In other words, the X-axis rotary connector 21, the Y-axis rotary connector 31, and the Z-axis rotary connector 41 are rotary connectors that can maintain the electrical connection between the power cable 5 and the drone 1 while allowing free movement of the universal joint 19. Slip rings can be used for such rotational connector 21, 31, 41, respectively. The slip ring is, for example, constructed of a rotation terminal having a ring shape, and a stationary terminal in contact with the rotation terminal. Examples of the stationary terminal include a metal brush.

As shown in FIG. 1, the horizontal pump drone 6B also has the universal joint 19 described above, and the power cable 5 is coupled to the horizontal pump drone 6B through the universal joint 19. Similarly, the top drone 1 also has the universal joint 19 described above, and the power cable 5 is coupled to the top drone 1 through the universal joint 19.

Figure 4:
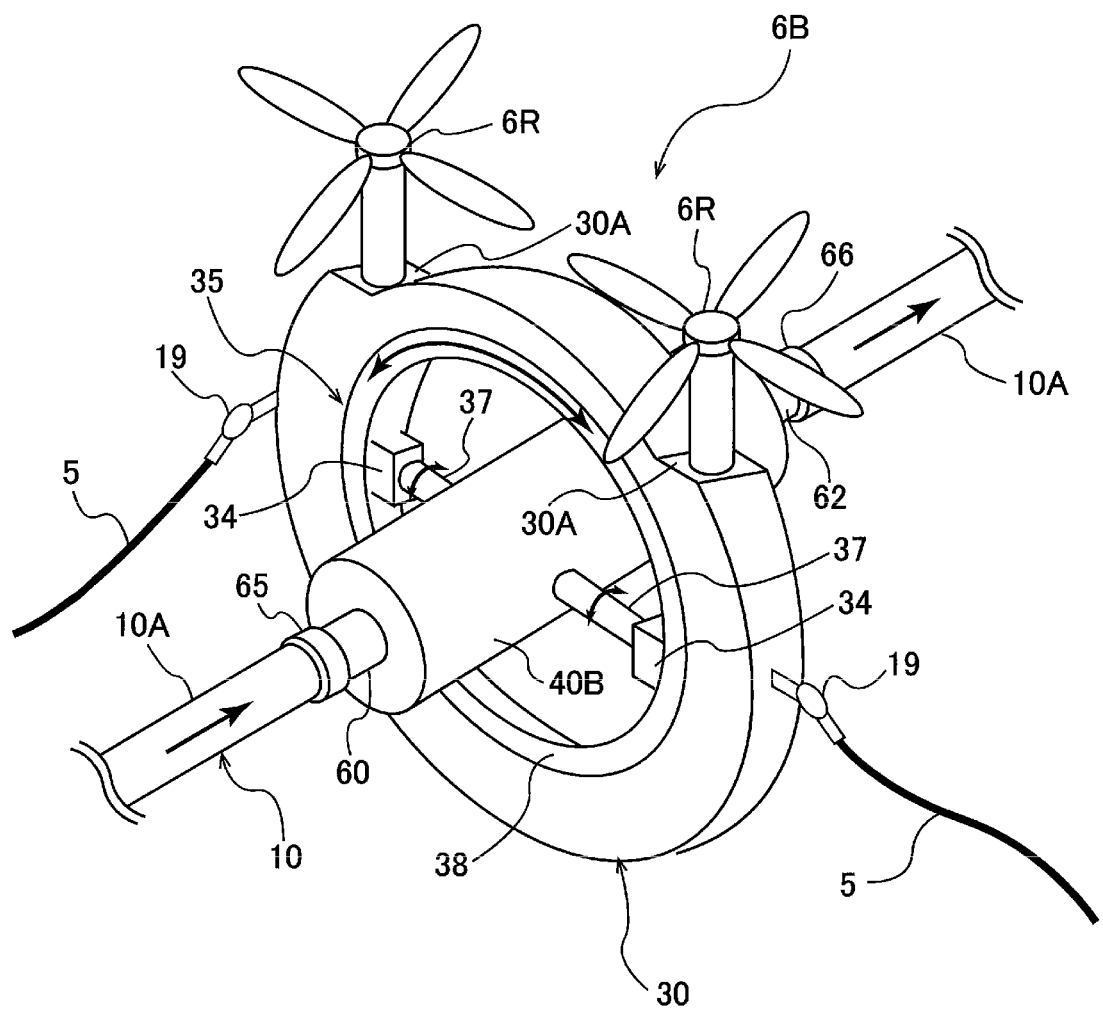
FIG. 4 is a perspective view showing an example of a horizontal pump drone.

FIG. 4 is a perspective view showing an example of the horizontal pump drone 6B. Configuration of this embodiment, which will not be specifically described, is the same as that of the vertical pump drone 6A described with reference to FIG. 2, and duplicate explanations thereof will be omitted.

The horizontal pump drone 6B shown in FIG. 4 also has a plurality of (in the illustrated example, two) rotary blades 6R, a pump 40B, a ring-shaped pump drone body 30, and a coupling mechanism 35 for tiltably and rotatably coupling the pump 40B to the pump drone body 30. The pump 40B and the coupling mechanism 35 are located inside the pump drone body 30. This horizontal pump drone 6B differs from the vertical pump drone 6A described with reference to FIG. 2 in that the conduit 10A (i.e., the transport pipe 10) coupled to the pump 40B is coupled to the pump drone body 30 through the coupling mechanism 35 such that the conduit extends in an approximate horizontal direction.

Each rotary blade 6R is attached to a shoulder portion 30A formed on an outer periphery of the pump drone body 30. In this embodiment, the coupling mechanism 35 also includes coupling shafts 37 fixed to the pump 40B, and a ring-shaped rotating member 38 for rotatably supporting the coupling shafts 37. The rotating member 38 is rotatably supported by the pump drone body 30. The coupling shafts 37 extending from an outer surface of the pump 40B to an inner surface of the rotating member 38, respectively are rotatably supported by bearings 34, each of which is fixed to the inner surface of the rotating member 38. Therefore, the pump 40B and the transport pipe 10 coupled to the pump 40B are rotatable with respect to the pump drone body 30 through the coupling shaft 37 and the rotating member 38, and are tiltable with respect to the pump drone body 30, supporting the rotating member 38, through the coupling shaft 37. With this configuration, the pump 40B is rotatably and tiltably supported by the pump drone body 30, increasing the degree of freedom of operation of the pump drone 6B with respect to the transport pipe 10 coupled to the pump 40B.

In this embodiment, it is also preferable to couple the inlet pipe 60 and the discharge pipe 62 of the pump 40B to the conduits 10A through the swivel joints 65 and 66, respectively. The swivel joints 65, 66 allow the horizontal pump drone 6B in the entirety to be rotated with respect to the conduits 10A, further increasing the freedom of movement of the horizontal pump drone 6B with respect to the conduits 10A (i.e., transport pipe 10) connected to the pump 40B.

Further, the power cable 5 is coupled to the pump drone 6B through the universal joint 19 described with reference to FIG. 3. The universal joints 19 allows the pump drone 6B to be freely rotated and freely tilted with respect to the power cable 5, so that the pump drone 6B can maintain a stable posture in the air and can fly stably.

In this manner, the top drone 1 and the pump drones 6A, 6B are coupled in series through the universal joints 19 and the power cables 5. This configuration allows the electrical connection between the power cables 5, and the top drone 1 and the pump drones 6A, 6B to be maintained even though the power cable 5, to which power is supplied from the power supply unit 3, is tilted in any direction with respect to the top drone 1 and the pump drones 6A, 6B. Therefore, the top drone 1 and the pump drones 6A, 6B can continue to fly for a long time without their postures being disturbed by the power cables 5.

Further, in this embodiment, each pump drone 6A, 6B is rotatable and tiltable with respect to the conduits 10A (i.e., the transport pipe 10) by means of the coupling mechanism 35. Furthermore, the swivel joints 65, 66 eliminate the twisting of the conduits 10A with respect to each pump drone 6A, 6B. Therefore, since the transport pipe 10 is rotatable and tiltable in all directions with respect to the top drone 1 and the pump drones 6A, 6B, the transport pipe 10 can be bent like a multijointed robot arm with each pump drone 6A, 6B as the fulcrum. As a result, even though there are various obstacles (e.g., natural objects such as trees, rocks, cliffs, and mountains, and man-made objects such as houses, buildings, bridges, and power lines) between the remote area 200 and the demand area 300, the top drone 1 holding the nozzle 11 can be reached to the demand area 300. The water flowing through the transport pipe 10 is continuously supplied from the nozzle 11 to the tank 301.

Figure 5:
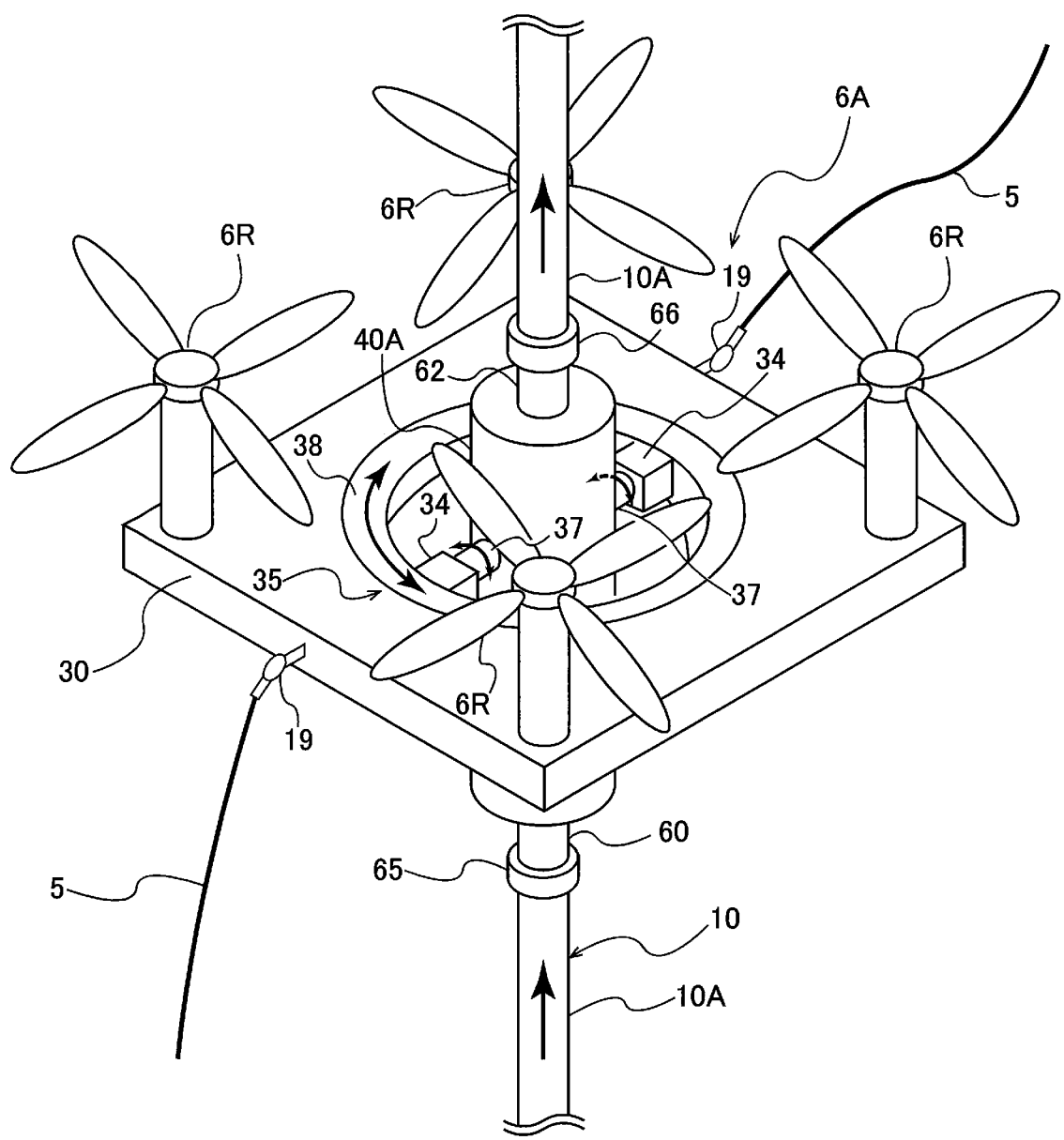
FIG. 5 is a perspective view schematically showing the vertical pump drone according to another embodiment.

FIG. 5 is a perspective view schematically showing the vertical pump drone 6A according to another embodiment. Configuration of this embodiment, which will be not specifically described, is the same as that of the embodiment shown in FIG. 2, and duplicate explanations thereof will be omitted.

The vertical pump drone 6A shown in FIG. 5 is different from the vertical pump drone 6A shown in FIG. 2 in that the pump drone body 30 has a rectangular shape. In this embodiment, the four rotary blades 6R are fixed to an upper surface of the pump drone body 30 having a rectangular shape. Thus, the shape of the pump drone body 30 is freely-selected, and the number of rotary blades 6R is also freely-selected.

Figure 6A:
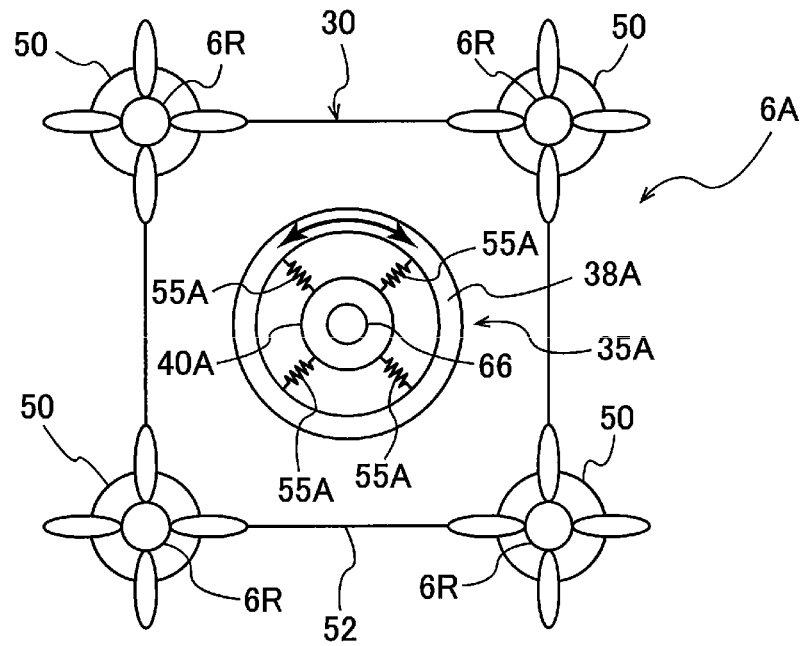
FIG. 6A is a top view showing the vertical pump drone according to still another embodiment.
Figure 6B:
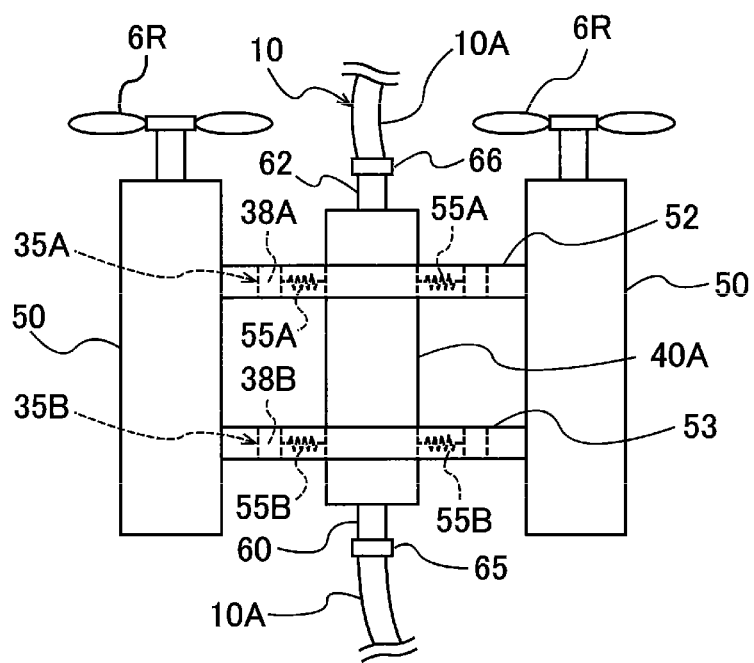
FIG. 6B is a side view of the vertical pump drone shown in FIG. 6A.

FIGS. 6A and 6B are schematic views, each showing the vertical pump drone 6A according to still another embodiment. More specifically, FIG. 6A is a top view showing the vertical pump drone 6A according to still another embodiment, and FIG. 6B is a side view of the vertical pump drone 6A shown in FIG. 6A. Configuration of this embodiment, which will not be specifically described, is the same as that of the embodiment shown in FIG. 2, and the duplicate description thereof is omitted. In FIGS. 6A and 6B, the universal joints 19 and the power cables 5 are omitted from illustration.

The pump drone body 30 of the vertical pump drone 6A shown in FIGS. 6A and 6B is constructed of a plurality of (in the illustrated example, four) post members 50, and a first plate body 52 and a second plate bodies 53 which are fixed to these post members 50, respectively. When the vertical pump drone 6A is flown, the first plate body 52 is positioned above the second plate body 53. Each post member 50 has an upper surface to which the rotary blade 6R for flying the vertical pump drone 6A is fixed.

In this embodiment, the pump 40A is coupled to the pump drone body 30 by a first coupling mechanism 35A and a second coupling mechanism 35B. The first coupling mechanism 35A is located inside the first plate body 52, and the second coupling mechanism 35B is located inside the second plate body 53. The second coupling mechanism 35B has the same configuration as the first coupling mechanism 35A, and thus the configuration of the first connection mechanism 35A will be described below.

As shown in FIGS. 6A and 6B, the first coupling mechanism 35A has a first rotating member 38A rotatably supported by the first plate body 52, and a plurality of (in the illustrated example, four) spring members 55A extending from the first rotating member 38A to the pump 40A. The first rotating member 38A has a ring shape, and is rotatably supported by the first plate body 52. More specifically, an outer surface of the first rotating member 38A is rotatably supported on a wall surface of the through-hole formed in the first plate 52. The four spring members 55A are arranged at equal intervals in a circumferential direction along an outer circumferential surface of the pump 40A, and extend radially from the outer circumferential surface of the pump 40A to the inner surface of the first rotating member 38A. One end of each spring member 55A is fixed to the outer circumferential surface of the pump 40A, and the other end is fixed to the inner circumferential surface of the first rotating member 38B. When the pump 40A is tilted with respect to the first plate body 52, some of the spring members 55A are contracted and the remaining spring members 55A are extended. The contracted spring members 55A push back the pump 40A to return the pump 40A to an original position thereof, and the extended spring members 55A pull back the pump 40A to return the pump 40A to the original position thereof. With this configuration, the pump 40A and the transport pipe 10 coupled to the pump 40A can be rotated with respect to the pump drone body 30 through the spring members 55A and the first rotating member 38A, and can be tilted with respect to the pump drone body 30 supporting the first rotating member 38 through the spring members 55A. This configuration allows the degree of freedom of movement of the vertical pump drone 6A with respect to the transport pipe 10 coupled to the pump 40A to be increased.

In the embodiment shown in FIGS. 6A and 6B, it is also preferable to couple the inlet pipe 60 and discharge pipe 62 of the pump 40A to the conduits 10A through the swivel joints 65, 66, respectively. The swivel joints 65, 66 allow the vertical pump drone 6A in the entirety to be rotated with respect to the conduits 10A, further increasing the freedom of movement of the vertical pump drone 6A with respect to the conduits 10A (i.e., the transport pipe 10).

Figure 7A:
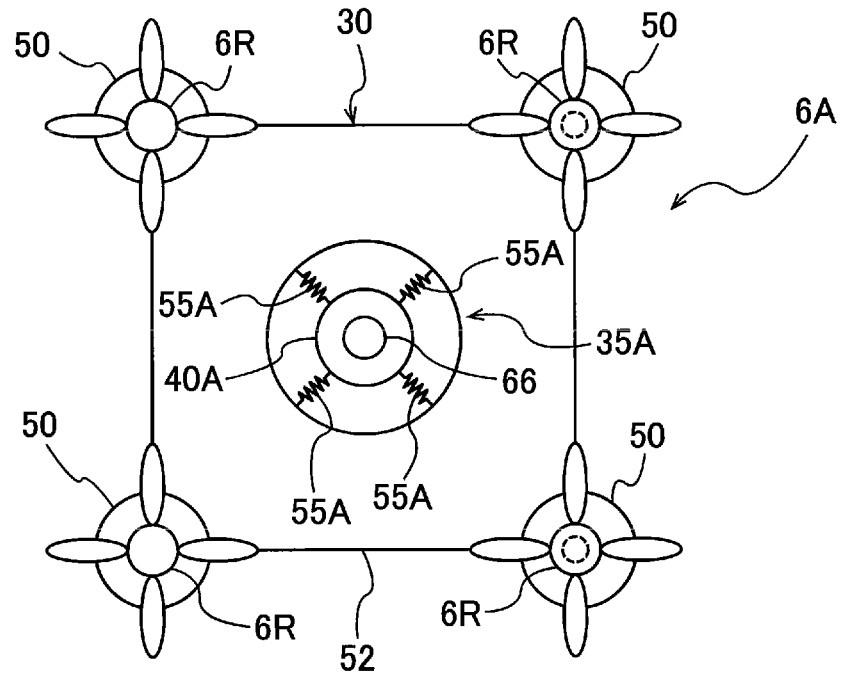
FIG. 7A is a top view of the vertical pump drone according to still another embodiment.
Figure 7B:
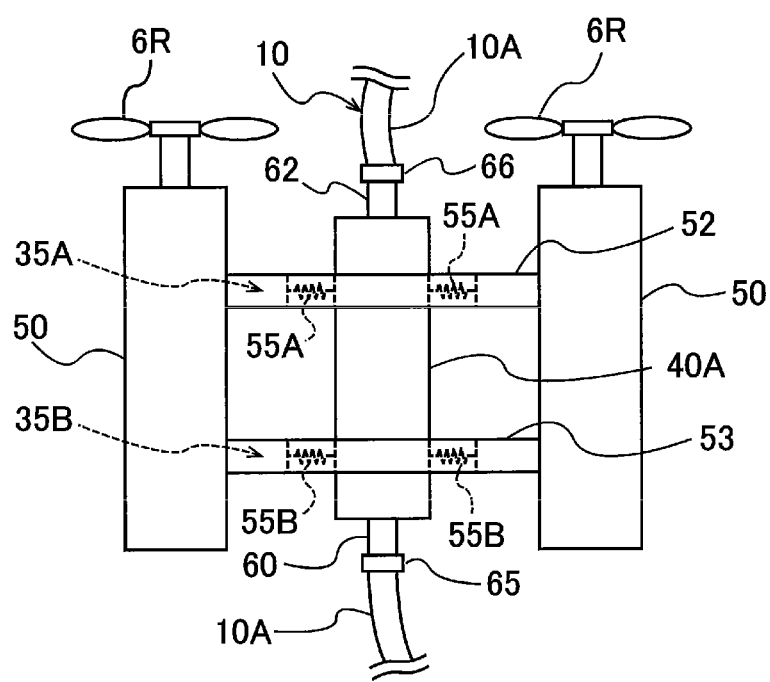
FIG. 7B is a side view of the vertical pump drone shown in FIG. 7A.

FIGS. 7A and 7B are schematic views, each showing the vertical pump drone 6A according to still another embodiment. More specifically, FIG. 7A is a top view of the vertical pump drone 6A according to still another embodiment, and FIG. 7B is a side view of the vertical pump drone 6A shown in FIG. 7A. The vertical pump drone 6A shown in FIGS. 7A and 7B corresponds to a modification example of the vertical pump drone 6A shown in FIGS. 6A and 6B. Configuration of this embodiment, which will not be specifically described, is the same as that of the embodiment shown in FIGS. 6A and 6B, and the duplicate description thereof is omitted. In FIGS. 7A and 7B also, the universal joints 19 and the power cables 5 are omitted from illustration.

The vertical pump drone 6A shown in FIGS. 7A and 7B is different from the vertical pump drone 6A shown in FIGS. 6A and 6B in that the first rotating member 38A of the first coupling mechanism 35A and the second rotating member 38B of the second coupling mechanism 35B are omitted. More specifically, the first coupling mechanism 35A is constructed of the plurality of spring members 55A, one end of each spring member 55A being fixed to the outer surface of the pump 40A, and the other end being fixed to the wall surface of the through-hole formed in the first plate body 52. Similarly, the second coupling mechanism 35B is constructed of the plurality of spring members 55B, and one end of each spring member 55B being fixed to the outer surface of the pump 40A, and the other end being fixed to the wall surface of the through-hole formed in the second plate body 53.

Thus, the first coupling mechanism 35A and the second coupling mechanism 35B allow the tilting motion of the pump 40A with respect to the pump drone body 30, but not the rotating motion of the pump 40A. However, the swivel joints 65, 66 allow the vertical pump drone 6A in the entirety to be rotated with respect to the conduits 10A, so that the degree of freedom of movement of the vertical pump drone 6A with respect to the conduits 10A (i.e., the transport pipe 10) can be increased.

Figure 8:
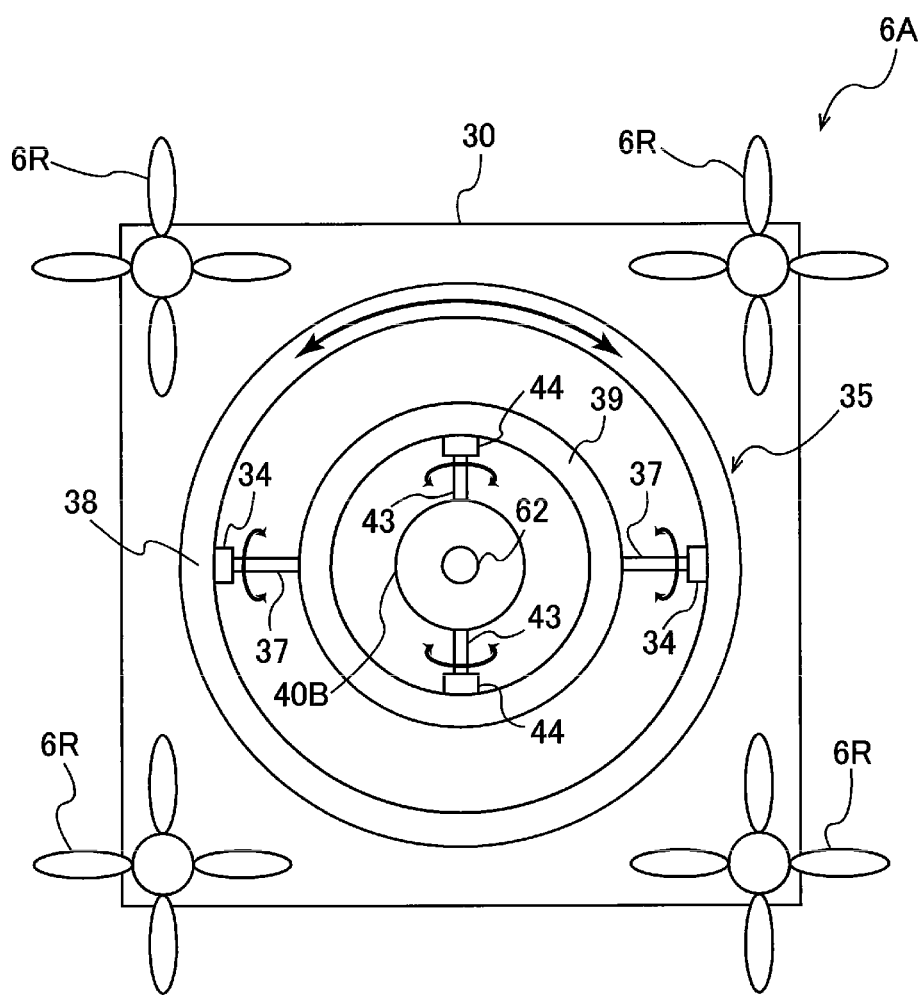
FIG. 8 is a schematic view showing the vertical pump drone according to still another embodiment.

FIG. 8 is a schematic view showing the vertical pump drone 6A according to still another embodiment. FIG. 8 corresponds to a top view of the vertical pump drone 6A. Configuration of this embodiment, which will not be specifically described, is the same as that of the embodiment shown in FIG. 2, and duplicate descriptions thereof are omitted. In FIG. 8 also, the universal joints 19 and the power cables 5 are omitted from illustration.

The vertical pump drone 6A shown in FIG. 8 has a rectangular-shaped pump drone body 30, and the four rotary blades 6R are fixed to an upper surface of the drone body 30. In this embodiment also, the pump 40A is rotatably and tilatably coupled to the pump drone body 30 by the coupling mechanism 35.

The coupling mechanism 35 shown in FIG. 8 has the rotating member 38 rotatably supported by the pump drone body 30, a support structure 39 coupled to the rotating member 38, first coupling shafts 37 coupling the rotating member 38 to the support structure 39, and second coupling shafts 43 coupling the support structure 39 to the pump 40A. The first coupling shafts 37 and the second coupling shafts 43 extend in different directions from each other. In this embodiment, the support structure 39 has a ring shape, and the support structure 39 is located inside the rotating member 38. The shape of the support structure 39 is freely-selected, and may have, for example, a semi-ring shape, or a rectangular shape.

In this embodiment, the two first coupling shafts 37 are aligned in a straight line, and the two second coupling shafts 43 are aligned in a straight line, the first coupling shafts 37 and the second coupling shafts 43 being arranged perpendicular to each other. One end of each first coupling shaft 37 is fixed to the outer surface of the support structure 39, and the other end is rotatably supported by a bearing 34 provided on an inner surface of the rotating member 38. One end of each second coupling shaft 43 is fixed to the outer surface of the pump 40A, and the other end is rotatably supported by a bearing 44 provided on an inner surface of the support structure 39. Therefore, the pump 40A and the support structure 39 are rotatable with respect to the pump drone body 30 through the rotating member 38, and tiltable with respect to the rotating member 38 and the pump drone body 30 through the first coupling shafts 37. Further, the pump 40A is tiltable with respect to the support structure 39 through the second coupling shafts 44. Therefore, the pump 40A and the conduits 10A (i.e., the transport pipe 10) coupled to the pump 40A are rotatable and tiltable in all directions with respect to the pump drone body 30. With this configuration, the freedom of movement of the vertical pump drone 6A with respect to the transport pipe 10 coupled to the pump 40A can be increased.

In the embodiment shown in FIG. 8 also, it is preferable to couple the inlet pipe 60 and the discharge pipe 62 of the pump 40A to the conduits 10A through the swivel joints 65, 66, respectively. The swivel joints 65, 66 allow the vertical pump drone 6A in the entirety to be rotated with respect to the conduits 10A, so that the freedom of movement of the vertical pump drone 6A with respect to the conduits 10A (i.e., the transport pipe 10) can be further increased.

Figure 9:
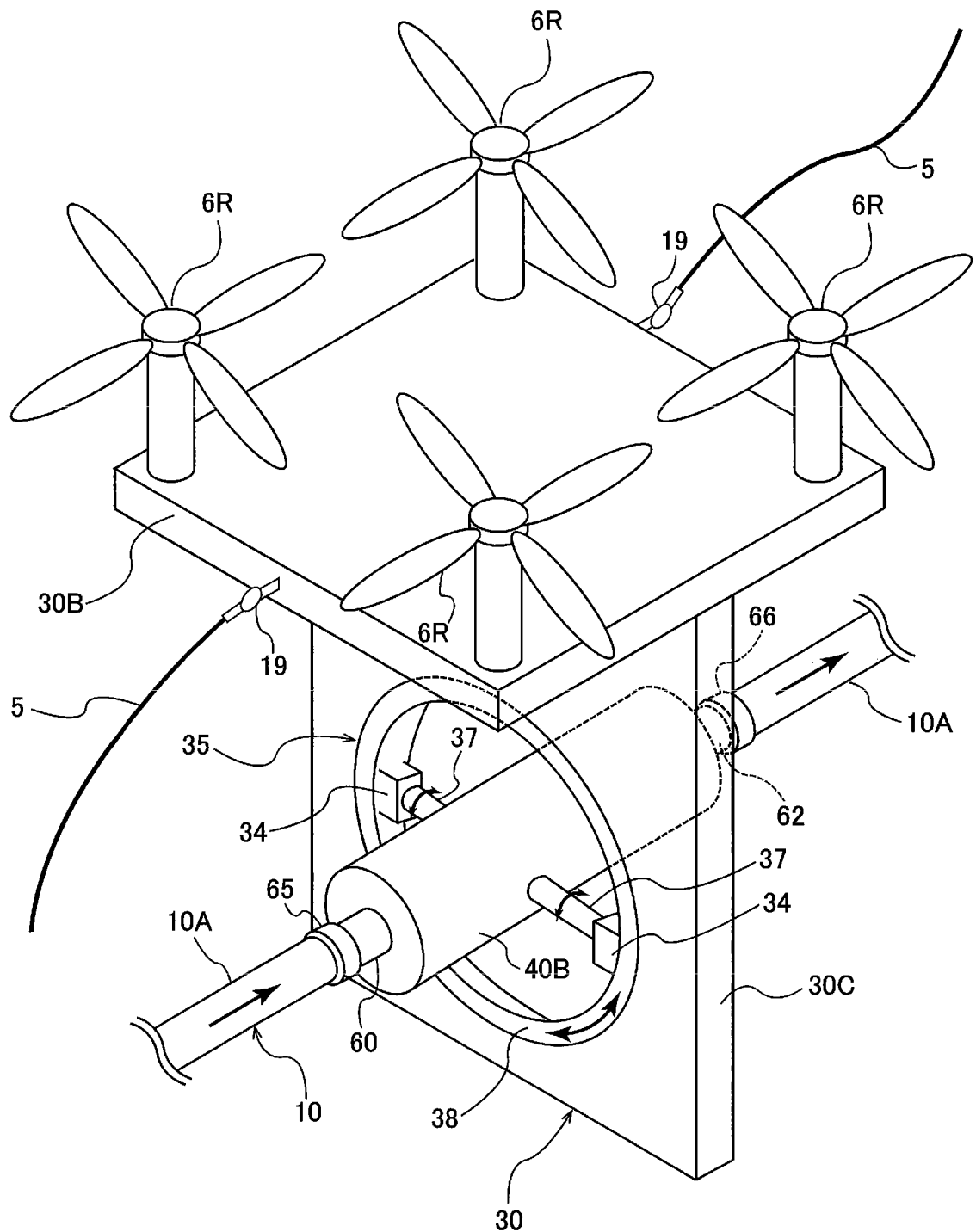
FIG. 9 is a perspective view schematically showing the horizontal pump drone according to another embodiment.

FIG. 9 is a perspective view schematically showing the horizontal pump drone 6B according to another embodiment. Configuration of this embodiment, which will not be specifically described, is the same as that of the embodiment shown in FIG. 4, and duplicate description thereof is omitted.

The pump drone body 30 of the horizontal pump drone 6B shown in FIG. 9 is constructed of a first structure 30B to which the rotary blades 6R are fixed, and a second structure 30C fixed to the first structure 30B. In this embodiment, the first structure 30B has a rectangular shape, and the four rotary blades 6R are fixed to an upper surface of the first structure 30B. The second structure 30C has a rectangular shape, and is fixed to a lower surface of the first structure 30B. The second structure 30C extends vertically with respect to the first structure 30B. The universal joints 19 are fixed to side surfaces of the first structure 30B, respectively. The electric power supplied to the pump drone body 30 through the power cables 5 and the universal joint 19 is supplied to the rotary blades 6R and the pump 40B through power lines (not shown), and is used to operate the rotary blades 6R and the pump 40B.

The coupling mechanism 35 described with reference to FIG. 4 is provided in the second structure 30C. More specifically, the coupling mechanism 35 is disposed in a through-hole formed in the second structure 30C, and includes the coupling shafts 37 fixed to the pump 40B, and the rotating member 38, having a ring-shape, rotatably supporting the coupling shafts 37. The rotating member 38 is rotatably supported in the through-hole of the second structure 30C. The coupling shafts 37 extending from the outer surface of the pump 40B to the inner surface of the rotating member 38 are rotatably supported by the bearings 34 fixed to the inner surface of the rotating member 38. With this configuration also, the pump 40B and the transport pipe 10 coupled to the pump 40B are rotatable with respect to the pump drone body 30 through the coupling shafts 37 and the rotating member 38, and are tiltable with respect to the pump drone body 30, supporting the rotating member 38, through the coupling shafts 37. Therefore, the degree of freedom of operation of the horizontal pump drone 6B with respect to the transport pipe 10 coupled to the pump 40B is increased.

In this embodiment also, it is preferable to couple the inlet pipe 60 and the discharge pipe 62 of the pump 40B to the conduits 10A through the swivel joints 65, 66, respectively. The swivel joints 65, 66 allow the horizontal pump drone 6B in the entirety to be rotated with respect to the conduits 10A, so that the freedom of movement of the horizontal pump drone 6B with respect to the conduits 10A (i.e., the transport pipe 10) supported to the pump 40B can be further increased.

Figure 10A:
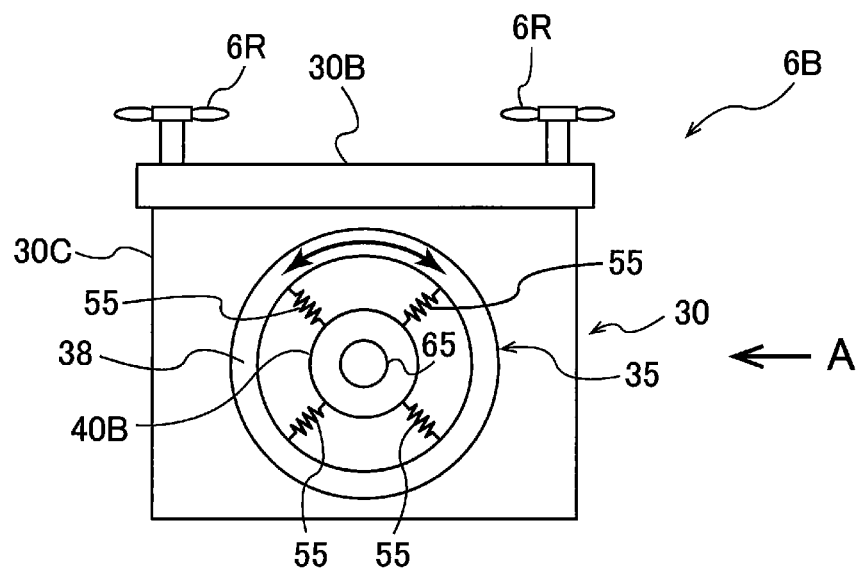
FIG. 10A is a side view of the horizontal pump drone according to still another embodiment.
Figure 10B:
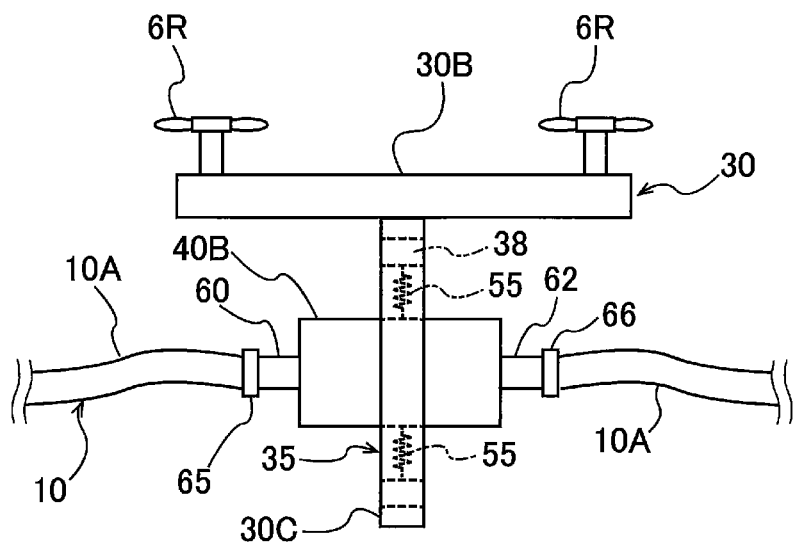
FIG. 10B is a view as viewed along arrow A in FIG. 10A.

FIGS. 10A and 10B are schematic views showing the horizontal pump drone 6B according to still another embodiment. More specifically, FIG. 10A is a side view of the horizontal pump drone 6B according to still another embodiment, and FIG. 10B is a view as viewed along arrow A in FIG. 10A. Configuration of this embodiment, which will not be specifically described, is the same as that of the embodiment shown in FIG. 9, and duplicate descriptions thereof is omitted. In FIGS. 10A and 10B, the universal joints 19 and the power cables 5 are omitted from illustration.

In the embodiment shown in FIGS. 10A and 10B also, the coupling mechanism 35 for rotatably and tiltably coupling the pump 40B to the pump drone body 30 is disposed in the second structure 30C of the pump drone body 30.

As shown in FIGS. 10A and 10B, the coupling mechanism 35 has the rotating member 38 having a ring shape, and the plurality of (four in the illustrated example) spring members 55 extending from the rotating member 38 to the pump 40B. The rotating member 38 is rotatably supported by the second structure 30C. More specifically, an outer surface of the rotating member 38 is rotatably supported on the wall surface of the through-hole formed in the second structure 30C. The four spring members 55 are arranged at equal intervals in the circumferential direction along the outer surface of the pump 40B, and extend radially from the outer surface of the pump 40B to the inner surface of the rotating member 38. One end of each spring member 55 is fixed to the outer peripheral surface of the pump 40B, and the other end is fixed to the inner peripheral surface of the rotating member 38. When the pump 40B is tilted with respect to the second structure 30C, some of the spring members 55 are contracted, and the remaining spring members 55 are extended. The contracted spring members 55 push back the pump 40B to return the pump 40B to an original position thereof, and the extended spring members 55 pull back the pump 40B to return the pump 40B to the original position thereof. With this configuration, the pump 40B and the transport pipe 10 coupled to the pump 40B can be rotated with respect to the pump drone body 30 through the spring members 55 and the rotating member 38, and can be tilted with respect to the pump drone body 30, supporting the rotating member 38, through the spring members 55. With this configuration, the degree of freedom of movement of the horizontal pump drone 6B with respect to the transport pipe 10 coupled to the pump 40B is increased.

In the embodiment shown in FIGS. 10A and 10B also, it is preferable to couple the inlet pipe 60 and the discharge pipe 62 of the pump 40B to the conduits 10A through the swivel joints 65, 66, respectively. The swivel joints 65, 66 allow the horizontal pump drone 6B in the entirety to be rotated with respect to the conduits 10A, so that the freedom of movement of the horizontal pump drone 6B with respect to the conduits 10A (i.e., the transport pipe 10) supported to the pump 40B can be further increased.

Figure 11A:
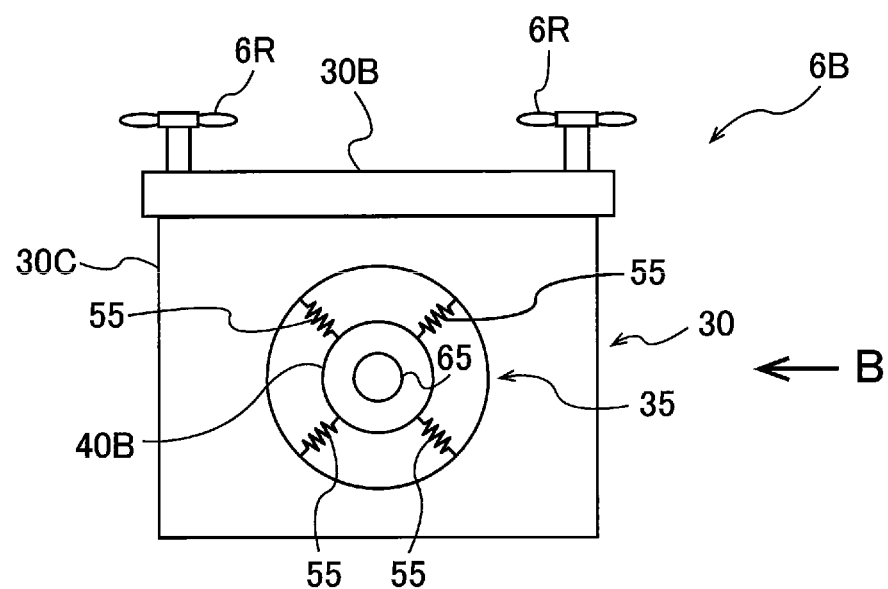
FIG. 11A is a side view of the horizontal pump drone according to still another embodiment.
Figure 11B:
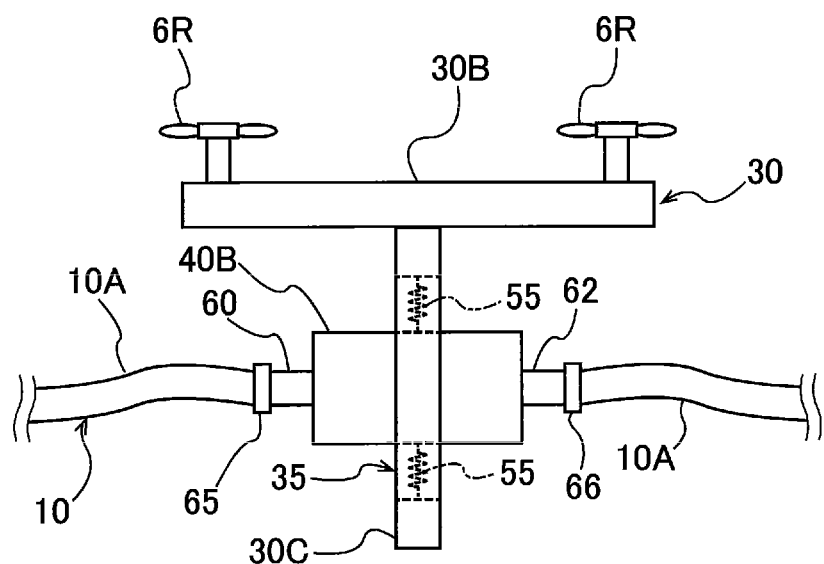
FIG. 11B is a view as viewed along arrow B in FIG. 11A.

FIGS. 11A and 11B are schematic views showing the horizontal pump drone 6B according to still another embodiment. More specifically, FIG. 11A is a side view of the horizontal pump drone 6B according to still another embodiment, and FIG. 11B is a view as viewed along arrow B in FIG. 11A. The horizontal pump drone 6B shown in FIGS. 11A and 11B corresponds to a modification example of the horizontal pump drone 6B shown in FIGS. 10A and 10B. Configuration of this embodiment, which will not be specifically described, is the same as that of the embodiment shown in FIGS. 10A and 10B, and duplicate description thereof is omitted. In FIGS. 11A and 11B also, the universal joints 19 and the power cables 5 are omitted from illustration.

The horizontal pump drone 6B shown in FIGS. 11A and 11B is different from the horizontal pump drone 6B shown in FIGS. 10A and 10B in that the rotating member 38 of the coupling mechanism 35 is omitted. Specifically, the coupling mechanism 35 is constructed of the plurality of spring members 55, one end of each spring member 55 being fixed to the outer surface of the pump 40B, and the other end being fixed to the wall surface of the through-hole formed in the second structure 30C.

Thus, the coupling mechanism 35 allows the tilting motion of the pump 40B with respect to the pump drone body 30, but not the rotating motion of the pump 40B. However, the swivel joints 65, 66 allow the horizontal pump drone 6B in the entirety to be rotated with respect to the conduits 10A, so that the degree of freedom of movement of the horizontal pump drone 6B with respect to the conduits 10A (i.e., the transport pipe 10) can be increased.

Figure 12A:
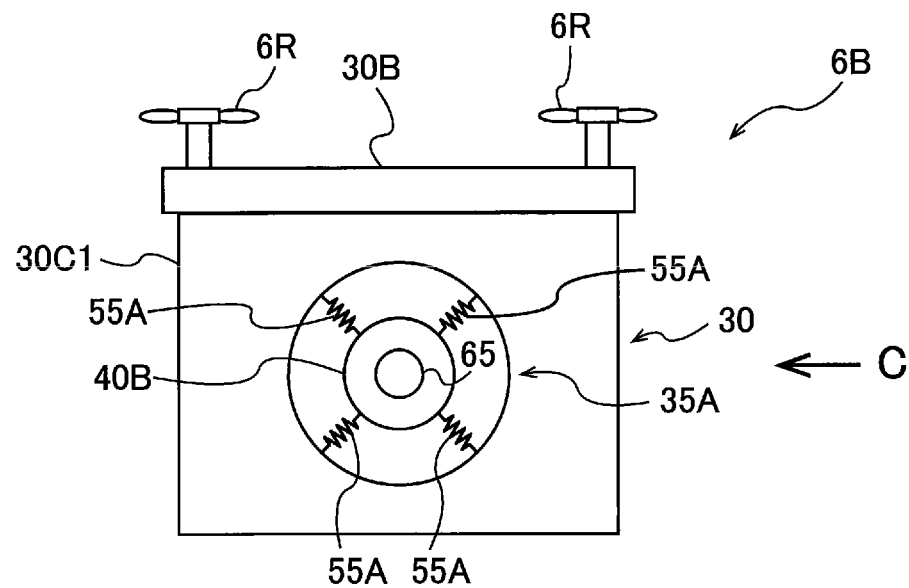
FIG. 12A is a side view of the horizontal pump drone according to still another embodiment.
Figure 12B:
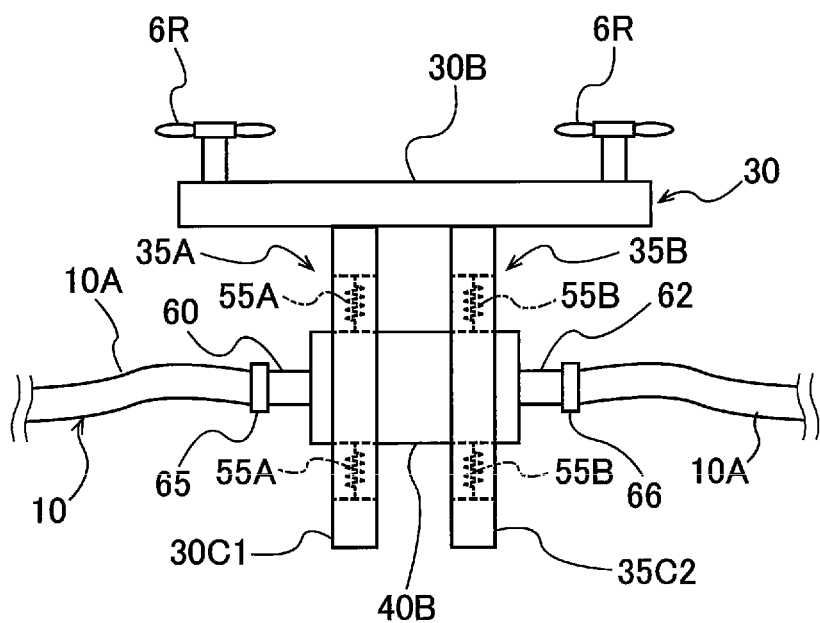
FIG. 12B is a view as viewed along arrow C in FIG. 12A.

FIGS. 12A and 12B are schematic views each showing the horizontal pump drone 6B according to still another embodiment. More specifically, FIG. 12A is a side view of the horizontal pump drone 6B according to still another embodiment, and FIG. 12B is a view as viewed along arrow C in FIG. 12A. The horizontal pump drone 6B shown in FIGS. 12A and 12B corresponds to a modification example of the horizontal pump drone 6B shown in FIGS. 11A and 11B. Configuration of this embodiment, which will not be specifically described, is the same as that of the embodiment shown in FIGS. 11A and 11B, and duplicate description thereof is omitted. In FIGS. 12A and 12B also, the universal joints 19 and the power cables 5 are omitted from illustration.

The pump drone body 30 of the horizontal pump drone 6B shown in FIGS. 12A and 12B is constructed of the first structure 30B, having a rectangular shape, to which the rotary blades 6R are fixed, and a second structure 30C1 and a third structure 30C2, each of which is fixed to the lower surface of the first structure 30B. The second structure 30C1 and the third structure 30C2 have the same rectangular shape as each other.

In this embodiment, the pump 40B is coupled to the pump drone body 30 by use of the first coupling mechanism 35A and the second coupling mechanism 35B. The first coupling mechanism 35A is located inside the second structure 30C1, and the second coupling mechanism 35B is located inside the third structure 30C2. The first coupling mechanism 35A and the second coupling mechanism 35B have the same configuration as the coupling mechanism 35 described with reference to FIGS. 11A and 11B. Specifically, the first coupling mechanism 35A is constituted of the plurality of spring members 55A, one end of each spring member 55A being fixed to the outer surface of the pump 40B, and the other end being fixed to the wall surface of the through-hole formed in the second structure 30C1. Similarly, the second coupling mechanism 35B is constructed of the plurality of spring members 55B, one end of each spring member 55B being fixed to the outer surface of the pump 40B, and the other end being fixed to the wall surface of the through-hole formed in the third structure 30C2.

Thus, the first coupling mechanism 35A and the second coupling mechanism 35B allow the tilting motion of the pump 40B with respect to the pump drone body 30, but not the rotating motion of the pump 40B. However, the swivel joints 65, 66 allow the horizontal pump drone 6B in the entirety to be rotated with respect to the conduits 10A, so that the degree of freedom of movement of the horizontal pump drone 6B with respect to the conduits 10A (i.e., the transport pipe 10) can be increased.

Figure 13A:
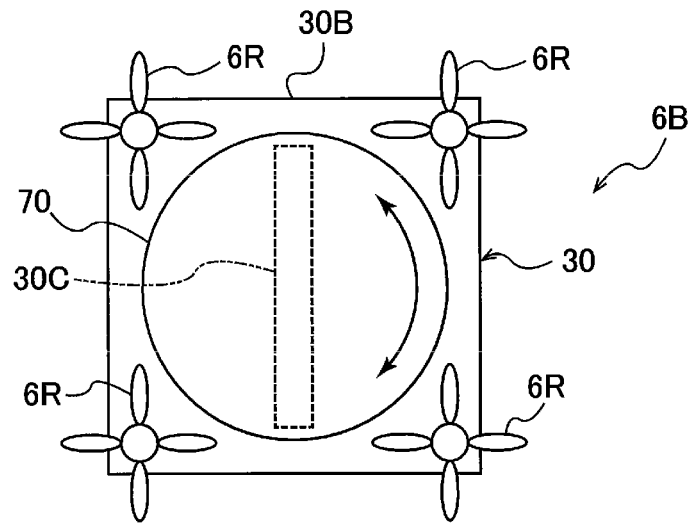
FIG. 13A is a top view of the horizontal pump drone according to still another embodiment.
Figure 13B:
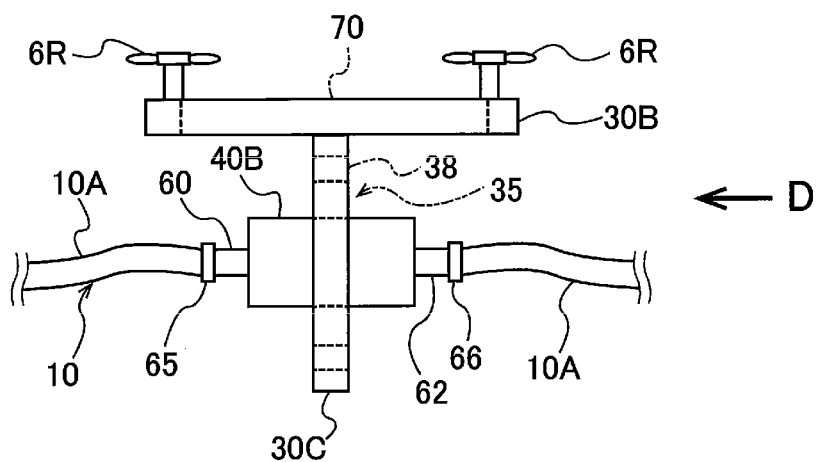
FIG. 13B is a side view of the horizontal pump drone shown in FIG. 13A.
Figure 13C:
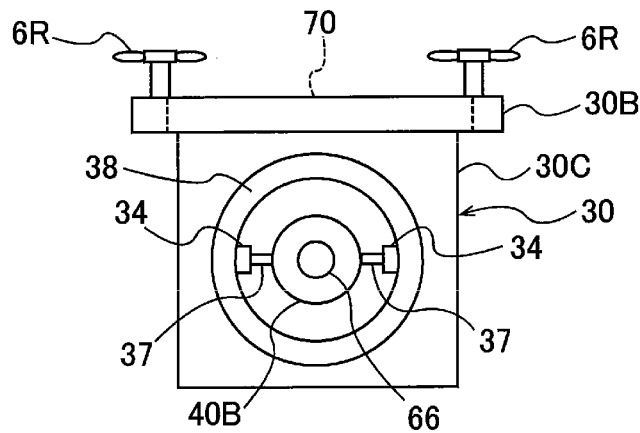
FIG. 13C is a view as viewed along arrow D in FIG. 13B.

FIGS. 13A, 13B, and 13C are schematic views each showing the horizontal pump drone 6B according to still another embodiment. More specifically, FIG. 13A is a top view of the horizontal pump drone 6B according to still another embodiment, FIG. 13B is a side view of the horizontal pump drone 6B shown in FIG. 13A, and FIG. 13C is a view as viewed along arrow D in FIG. 13B. The horizontal pump drone 6B shown in FIGS. 13A to 13C corresponds to a modification example of the horizontal pump drone 6B shown in FIG. 9. Configuration of this embodiment, which will not be specifically described, is the same as that of the embodiment shown in FIG. 9, and duplicate descriptions thereof is omitted. In FIGS. 13A to 13C also, the universal joints 19 and the power cables 5 are omitted from illustration.

The horizontal pump drone 6B shown in FIGS. 13A to 13C is different from the horizontal pump drone 6B shown in FIG. 9 in that the pump drone body 30 has a disk 70 which is rotatably supported on the wall surface of the through-hole formed in the first structure 30B.

The coupling mechanism 35 is rotatably and tiltably supported in the second structure 30C, and the second structure 30C is fixed to an lower surface of the disk 70. When the disk 70 rotates with respect to the first structure 30B of the pump drone body 30, the second structure 30B rotates together with the disk 70. Accordingly, the pump 40B, which is coupled to the second structure 30B through the coupling mechanism 35, and the conduits 10A (i.e., the transport pipe 10), which is coupled to the pump 40B, also rotate in unison with the disk 70.

A direction of rotation of the disk 70 is orthogonal to a direction of rotation of the rotating member 38 of the coupling mechanism 35. More specifically, a rotation axis of the disk 70 is orthogonal to a rotation axis of the rotating member 38. Therefore, the degree of freedom of operation of the horizontal pump drone 6B with respect to the transport pipe 10 coupled to the pump 40B is further increased.

Figure 14A:
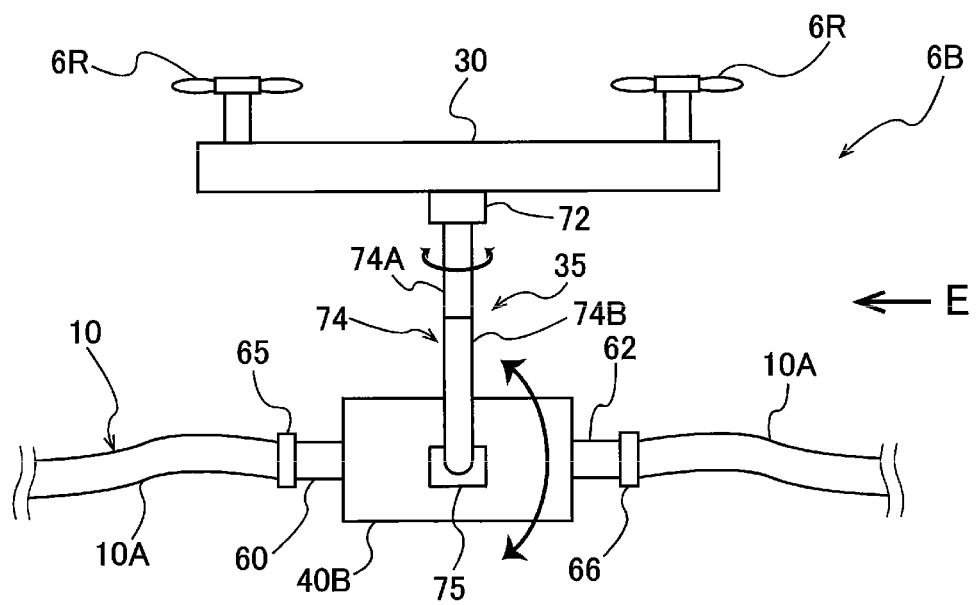
FIG. 14A is a side view of the horizontal pump drone according to still another embodiment.
Figure 14B:
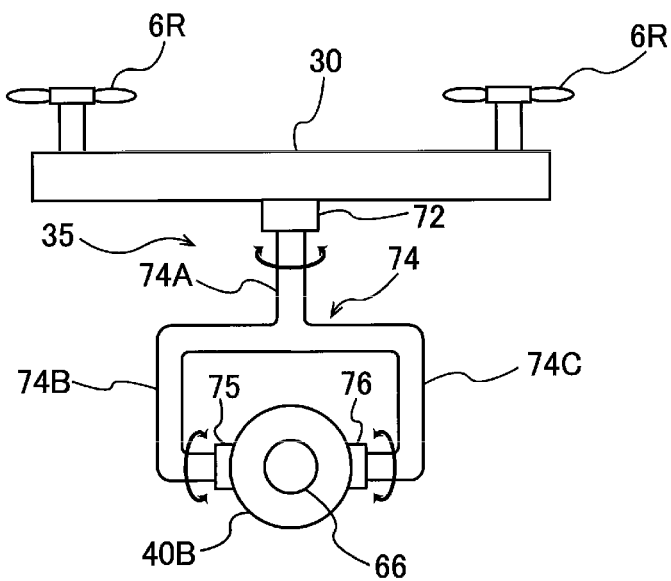
FIG. 14B is a view as viewed along arrow E in FIG. 14A.

FIGS. 14A and 14B are schematic views showing the horizontal pump drone 6B according to still another embodiment. More specifically, FIG. 14A is a side view of the horizontal pump drone 6B according to still another embodiment, and FIG. 14B is a view as viewed along arrow E in FIG. 14A.

The coupling mechanism 35 of the horizontal pump drone 6B shown in FIGS. 14A and 14B has a bearing 72 mounted to a lower surface of the pump drone body 30 having a rectangular shape, and a rotation shaft 74 rotatably supported by the bearing 72. The rotation shaft 74 is constructed of a main shaft 74A supported by the bearing 72, and a first branch shaft 74B and a second branch shaft 74C, each of which branches from the main shaft 74A. The first branch shaft 74B and the second branch shaft 74C have an approximate C shape, respectively. A tip end of the first branch shaft 74B is rotatably supported by a bearing 75 fixed to the outer surface of the pump 40B, and a tip end of the second branch shaft 74C is rotatably supported by a bearing 76 fixed to the outer surface of the pump 40B. In this embodiment, the coupling mechanism 35 is constructed of the bearing 72 mounted to the lower surface of the pump drone body 30, the rotation shaft 74 rotatably supported by the bearing 72, the bearing 75 which is provided with the pump 40B, and rotatably supports the tip end of the first branch pipe 74B of the rotation shaft 74, and the bearing 76 which is provided with the pump 40B, and rotatably supports the tip end of the second branch pipe 74C of the rotation shaft 74.

The pump 40B is tiltable with respect to the rotation shaft 74 through the bearings 75, 76, and the rotation shaft 74 is rotatable with respect to the pump drone body 30. With this coupling mechanism 35, the pump 40B is rotatably and tiltably coupled to the pump drone body 30. Therefore, the degree of freedom of operation of the horizontal pump drone 6B with respect to the transport pipe 10 coupled to the pump 40B is increased.

In this embodiment also, it is preferable to couple the inlet pipe 60 and the discharge pipe 62 of the pump 40B to the conduits 10A through the swivel joints 65, 66, respectively. The swivel joints 65, 66 allow the horizontal pump drone 6B in the entirety to be rotated with respect to the conduits 10A, so that the freedom of movement of the horizontal pump drone 6B with respect to the conduits 10A (i.e., the transport pipe 10) supported to the pump 40B can be further increased.

Figure 15A:
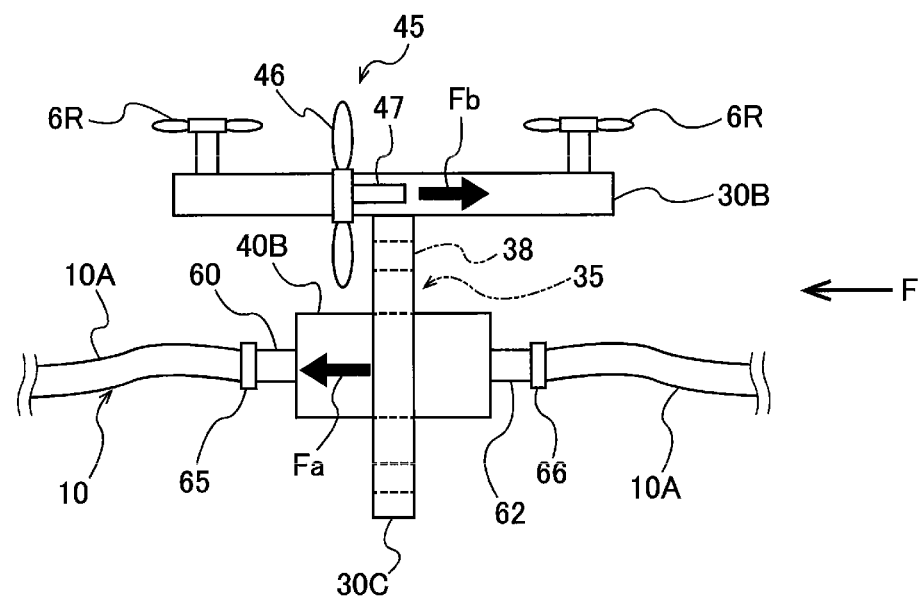
FIG. 15A is a side view of the horizontal pump drone according to still another embodiment.
Figure 15B:
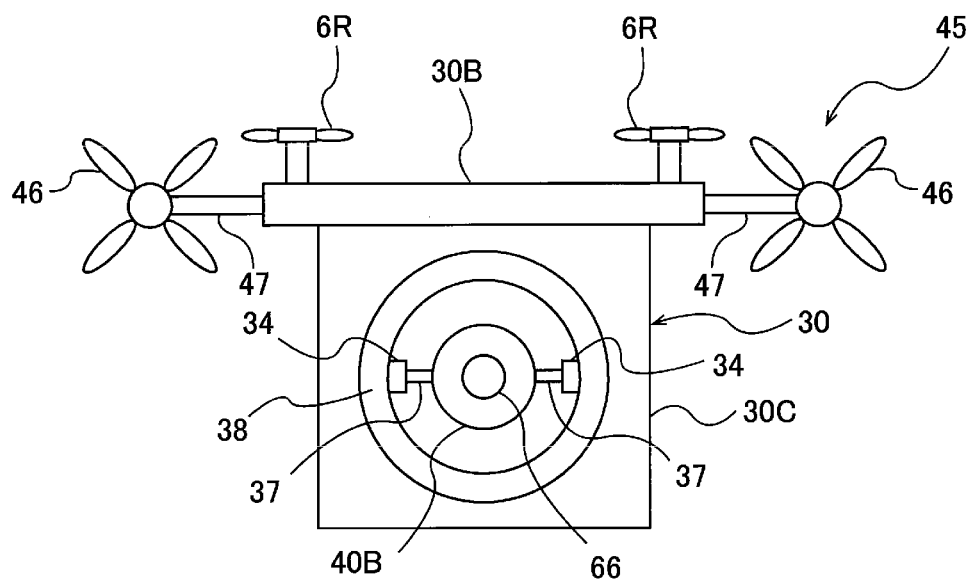
FIG. 15B is a view as viewed along arrow F in FIG. 15A.

FIGS. 15A and 15B are schematic views each showing the horizontal pump drone 6B according to still another embodiment. More specifically, FIG. 15A is a side view of the horizontal pump drone 6B according to still another embodiment, and FIG. 15B is a view as viewed along arrow F in FIG. 15A. The horizontal pump drone 6B shown in FIGS. 15A and 15B corresponds to a modification example of the horizontal pump drone 6B shown in FIG. 9. Configuration of this embodiment, which will not be specifically described, is the same as that of the embodiment shown in FIG. 9, and duplicate descriptions thereof will be omitted. In FIGS. 15A and 15B also, the universal joints 19 and the power cables 5 are omitted from illustration.

The horizontal pump drone 6B shown in FIGS. 15A and 15B is different from the horizontal pump drone 6B shown in FIG. 9 in that a balance mechanism 45 is provided, which is attached to the side of the first structure 30B.

When the pump 40B of the horizontal pump drone 6B is driven, a force Fa that acts in the opposite direction to the direction of water flow is applied to the pump drone body 30 of the horizontal pump drone 6B. Accordingly, in order to keep the horizontal pump drone 6B stationary in the air while driving of the pump 40B, it is necessary to tilt the pump body 30 of the horizontal pump drone 6B with respect to the pump 40B, such that a horizontal component of the thrust force generated by the rotary blades 6R is balanced with the force Fa. However, there is a limit to the range of tilt of the pump body 30 with respect to the pump 40B.

Thus, in this embodiment, the horizontal pump drone 6B includes the balance mechanism 45. The balance mechanism 45 serves as a mechanism for generating a force Fb to counteract the force Fa mentioned above. This balance mechanism 45 causes a force Fb that has the same magnitude as the force Fa, but acts in the opposite direction to the force Fa, to be generated to the pump body 30.

In the embodiment shown in FIGS. 15A and 15B, the balance mechanism 45 has arms 47 extending from both sides of the first structure 30B of the pump drone body 30, respectively, and rotary blades 46 attached to the tip of each arm 47. The rotary blades 46 are electrically coupled to the pump body 30 by power cables (not shown), and are operated by electric power supplied to the pump body 30 of the horizontal pump drone 6B through the power cable 5 described above. When the rotary blades 46 are driven, the force Fb is generated, which is applied to the pump body 30 in the opposite direction to the force Fa mentioned above. The controller 8 (see FIG. 1) can change a rotational speed of each rotary blade 46 to regulate a magnitude of the force Fb. With this configuration, a horizontal posture of the horizontal pump drone 6B can be maintained even when the pump 40B is driven.

In this embodiment, the balance mechanism 45 has the two rotary blades 46 which are rotated by electric power. However, the present invention is not limited to this embodiment. For example, the balance mechanism 45 may have only one rotary blade 46, or three or more rotary blades 46. Although not shown, the balance mechanism 45 may have an engine (e.g., reciprocating engine) driven by liquid fuel, or fuel gas, to rotate the rotary blades 46. As described later, the drone system 100 can be used to supply liquid fuel or fuel gas from the remote area 200 to the demand area 300. In this case, a part of the liquid fuel or the fuel gas flowing through the transport pipe 10 may be supplied to the engine of the balance mechanism 45.

Alternatively, instead of the rotary blades 46, the balance mechanism 45 may have a jet engine which burns jet fuel to generate the force Fb, or a nozzle which jets liquid, such as water, to generate the force Fb.

In one embodiment, the balance mechanism 45 may be provided in the horizontal pump drone 6B shown in FIG. 4, or the balance mechanism 45 may be provided in any of the horizontal pump drone 6B shown in FIGS. 10A to 14B.

Figure 16:
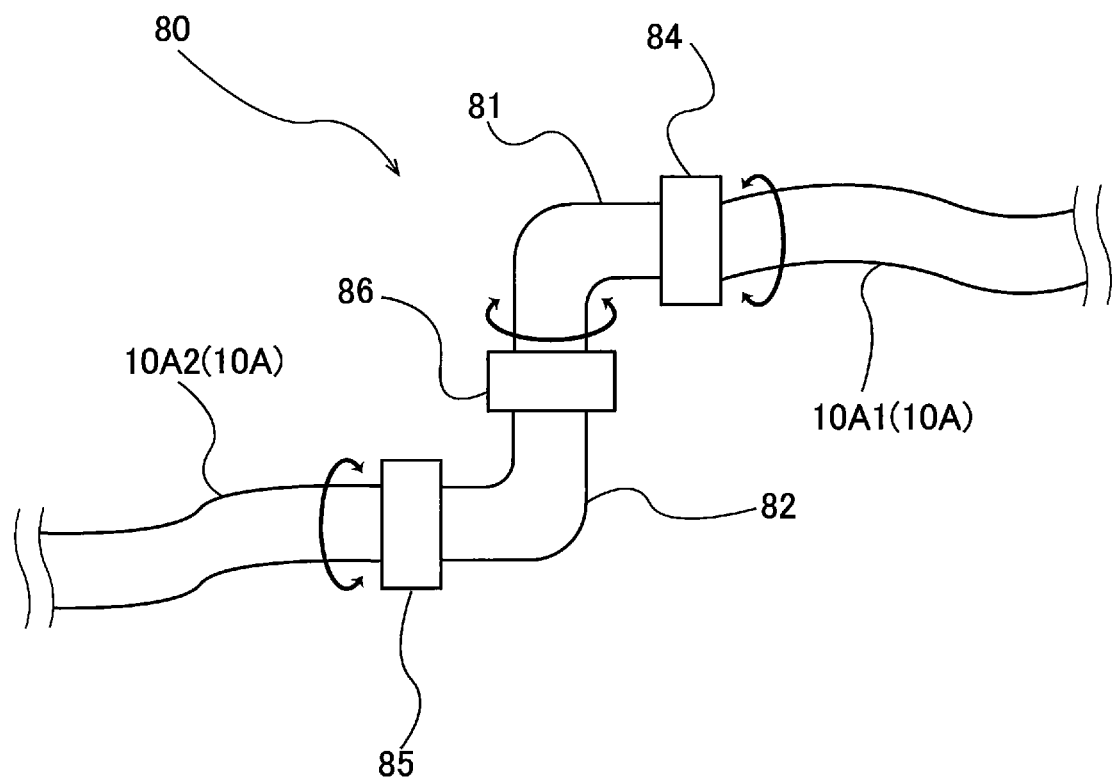
FIG. 16 is a schematic view showing an example of a swivel joint mechanism for coupling the adjacent conduits to each other.

The drone system 100 may further have a swivel joint that couples the adjacent conduits 10A to each other. Alternatively, a swivel joint mechanism combining a plurality of swivel joints may be used to couple the adjacent conduits 10A to each other. FIG. 16 is a schematic view showing an example of a swivel joint mechanism for coupling the adjacent conduits 10A to each other.

The swivel joint mechanism 80 shown in FIG. 16 is disposed between the conduit 10A1 and the conduit 10A2, and is used to couple the conduits 10A1, 10A2 to each other. The conduits 10A1 and 10A2 are adjacent conduits 10A of the plurality of conduits 10A constructing the transport pipe 10, and are coupled to each other by the swivel joint mechanism 80. In a flow direction of water in the transport pipe 10, the conduit 10A1 is located downstream of the conduit 10A2.

The swivel joint mechanism 80 has a first bent pipe 81, and a second bent pipe 82, each of which is bent in an approximate L-shape, a first swivel joint 84 attached to one end of the first bent pipe 81, a second swivel joint 85 attached to one end of the second bent pipe 82, and a third swivel joint 86 coupling the other end of the first bent pipe 81 to the other end of the second bent pipe 82. The first swivel joint 84 couples the first bent pipe 81 to the conduit 10A1, and thus allows the conduit 10A1 to be rotated with respect to the first bent pipe 81. The second swivel joint 85 couples the second bent pipe 82 to the conduit 10A2, and thus allows the conduit 10A2 to be rotated with respect to the second bent pipe 82. The third swivel joint 86 allows the second bent pipe 82 (or the first bent pipe 81) to be rotated with respect to the first bent pipe 81 (or the second bent pipe 82). In other words, the third swivel joint 86 allows the first bent pipe 81 and the second bent pipe 82 to rotate freely with respect to each other. Such swivel joint mechanism 80 is used to couple the conduits 10A1 and 10A2 to each other, so that the transport pipe 10 can be rotated in three dimensions. Therefore, the swivel joint mechanism 80 makes it possible to increase the degree of freedom of movement of the top drone 1 and each of the pump drones 6A, 6B that suspend the transport pipe 10, effectively preventing the transport pipe 10 to be contacted with objects existing between the demand area 200 and the disaster area 300.

Figure 17:
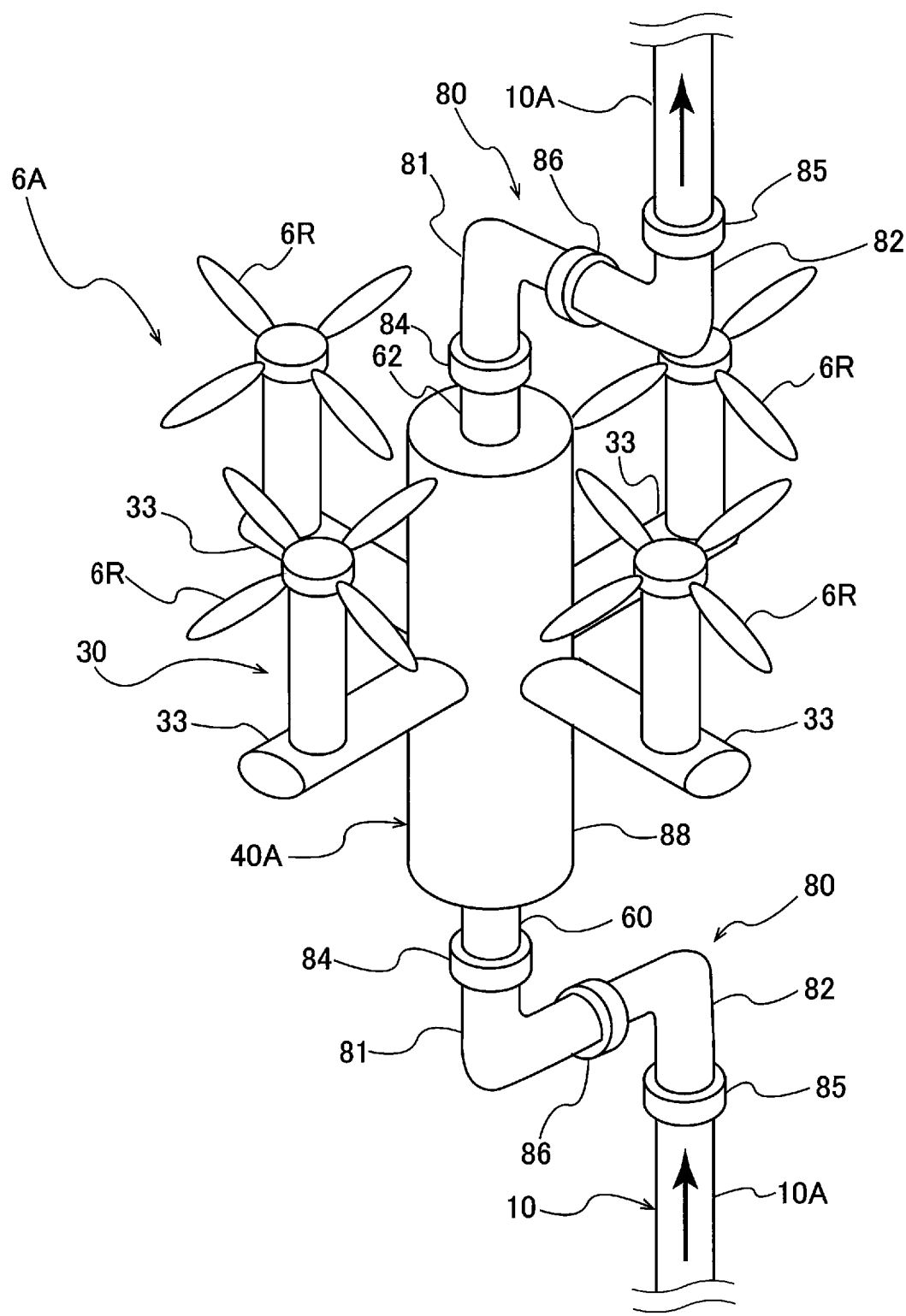
FIG. 17 is a perspective view schematically showing the vertical pump drone according to still another embodiment.
Figure 18:
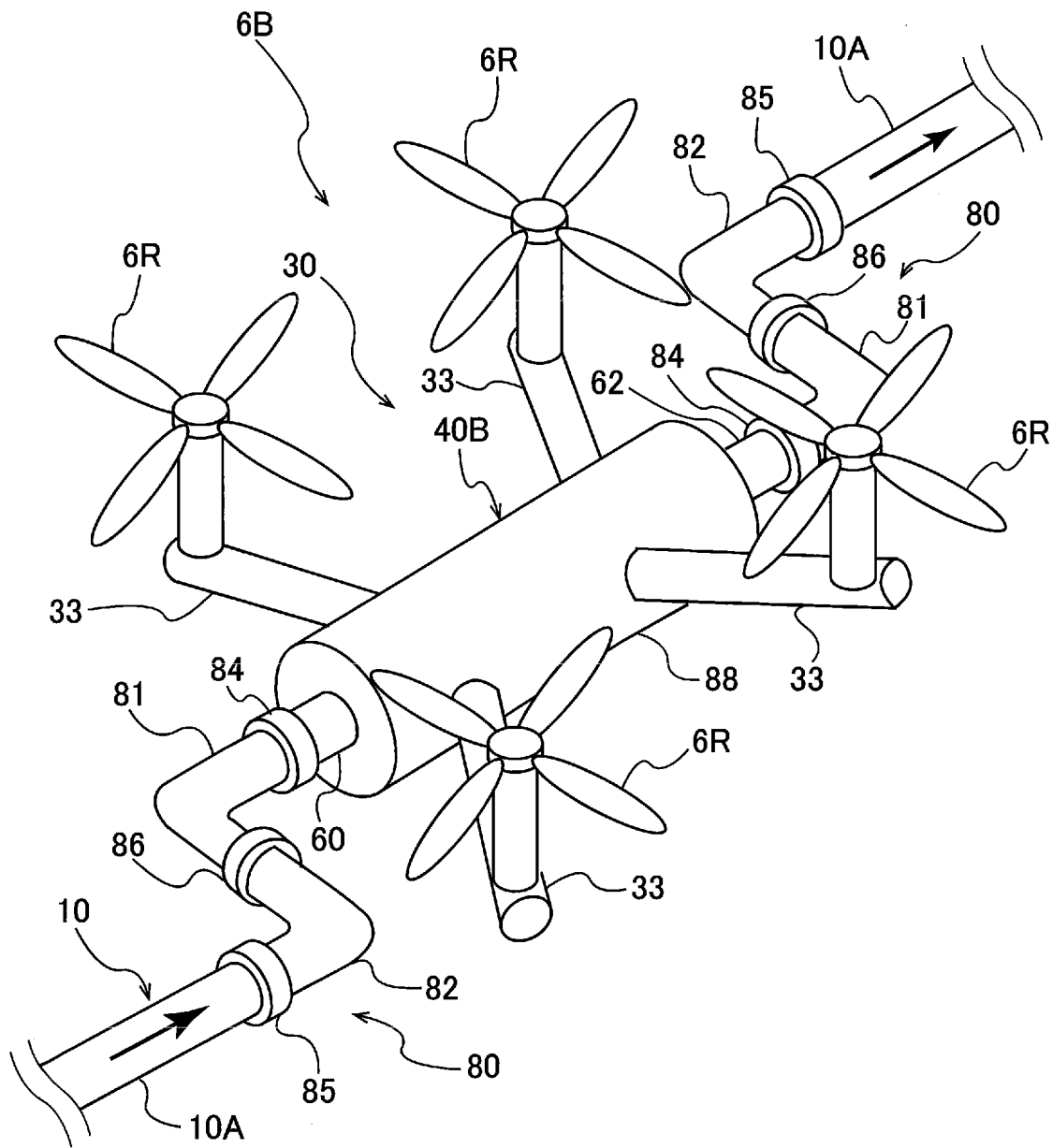
FIG. 18 is a perspective view schematically showing the horizontal pump drone according to still another embodiment.

FIG. 17 is a perspective view schematically showing the vertical pump drone 6A according to still another embodiment. FIG. 18 is a perspective view schematically showing the horizontal pump drone 6B according to still another embodiment. The pump drone body 30 of the vertical pump drone 6A shown in FIG. 17 is constructed of a pump body 88 of the pump 40A, and a plurality of (in the illustrated example, four) arms 33 protruding from an outer surface of the pump body 88. Each arm 33 has a tip end to which the rotary blade 6R is fixed. Similarly, the pump drone body 30 of the horizontal pump drone 6B shown in FIG. 18 is constructed of a pump body 88 of the pump 40B, and a plurality of (in the example shown, four) arms 33 protruding from an outer surface of the pump body 88. Each arm 33 has a tip end to which the rotary blade 6R is fixed.

The vertical pump drone 6A shown in FIG. 17 does not have the coupling mechanism for rotatably and tiltably coupling the pump 40A to the pump drone body 30. Similarly, the horizontal pump drone 6B shown in FIG. 18 does not have the coupling mechanism for rotatably and tiltably coupling the pump 40B to the pump drone body 30.

However, the inlet pipe 60 and the discharge pipe 62 of the vertical pump 40A are coupled to the conduits 10A through the swivel joint mechanisms 80 described with reference to FIG. 16, respectively. More specifically, the inlet pipe 60 and the discharge pipe 62 of the pump 40A are respectively coupled to the swivel mechanisms 80 through the first swivel joints 84, and the conduits 10A are respectively coupled to the swivel mechanisms 80 through the second swivel joints 85. Similarly, the inlet pipe 60 and the discharge pipe 62 of the horizontal pump 40B are respectively coupled to the conduits 10A through the swivel joint mechanisms 80 described with reference to FIG. 16. More specifically, the inlet pipe 60 and the discharge pipe 62 of the pump 40B are respectively coupled to the swivel mechanisms 80 through the first swivel joints 84, and the conduits 10A are respectively coupled to the swivel mechanisms 80 through the second swivel joints 85. In this manner, the pump 40A and the pump 40B may be coupled to the transport pipe 10 through the swivel joint mechanism 80. In these cases also, the freedom of movement of the vertical pump drone 6A and the horizontal pump drone 6B with respect to the conduits 10A (i.e., the transport pipe 10) can be increased.

Figure 19:
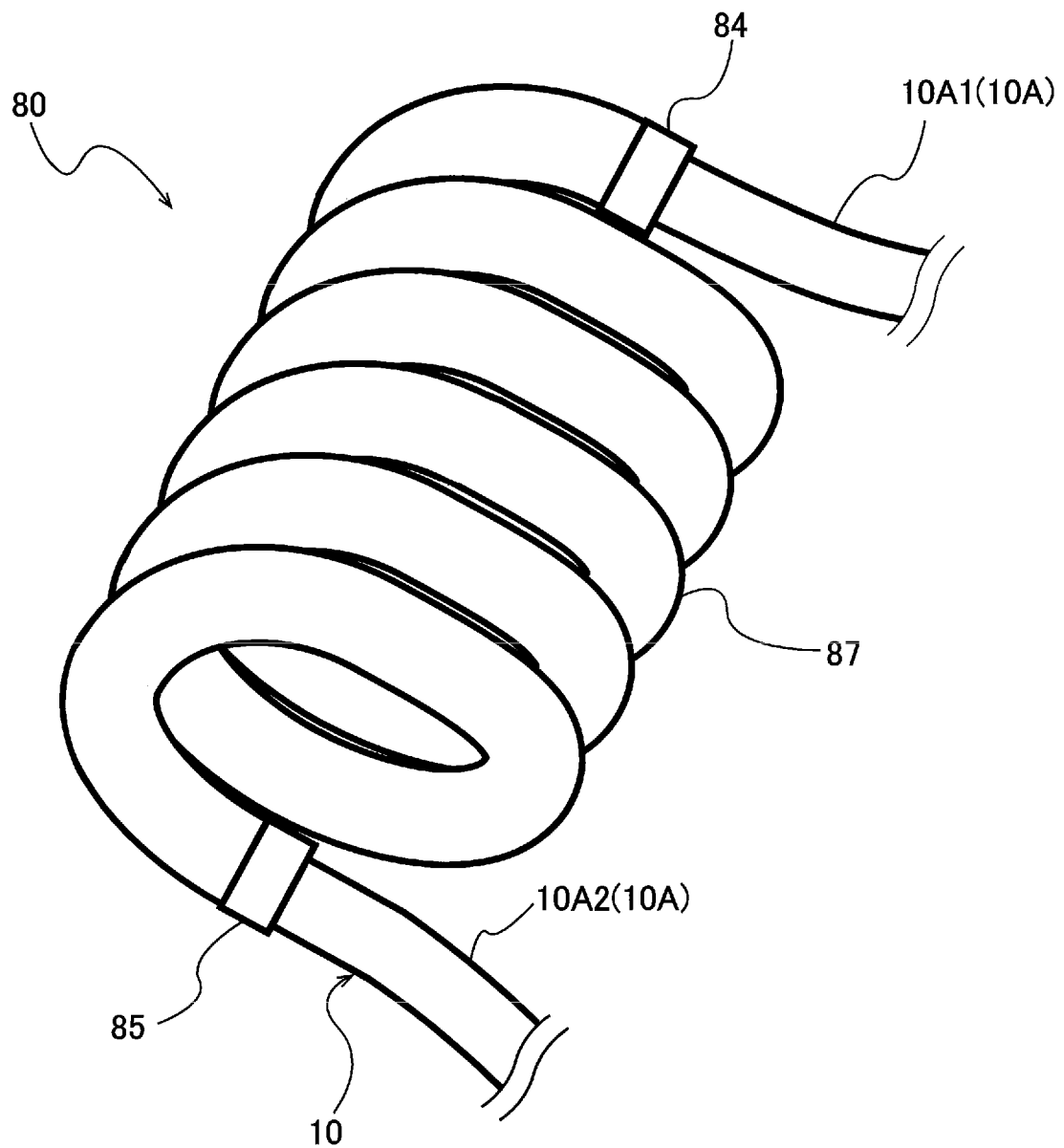
FIG. 19 is a schematic view showing another example of the swivel joint mechanism.

FIG. 19 is a schematic view showing another example of the swivel joint mechanism 80. The swivel joint mechanism 80 shown in FIG. 19 is constructed of a coil pipe 87, and the first swivel joint 84 and a second swivel joint 85, which are connected to both ends of the coil pipe 87, respectively. One end of the coil pipe 87 is connected to the conduit 10A1 through the first swivel joint 84, and the other end of the coil pipe 87 is connected to the conduit 10A2 through the second swivel joint 85. As described above, the conduits 10A1 and 10A2 are adjacent conduits 10A of the plurality of conduits 10A constructing the transport pipe 10, and are coupled to each other through the swivel joint mechanism 80. The coil pipe 87 is freely extendible and bendable. Therefore, this swivel joint mechanism 80 also make it possible to increase the degree of freedom of movement of the top drone 1 and each of the pump drones 6A, 6B that suspend the transport pipe 10, effectively preventing the transport pipe 10 to be contacted with objects existing between the demand area 200 and the disaster area 300.

Figure 20:
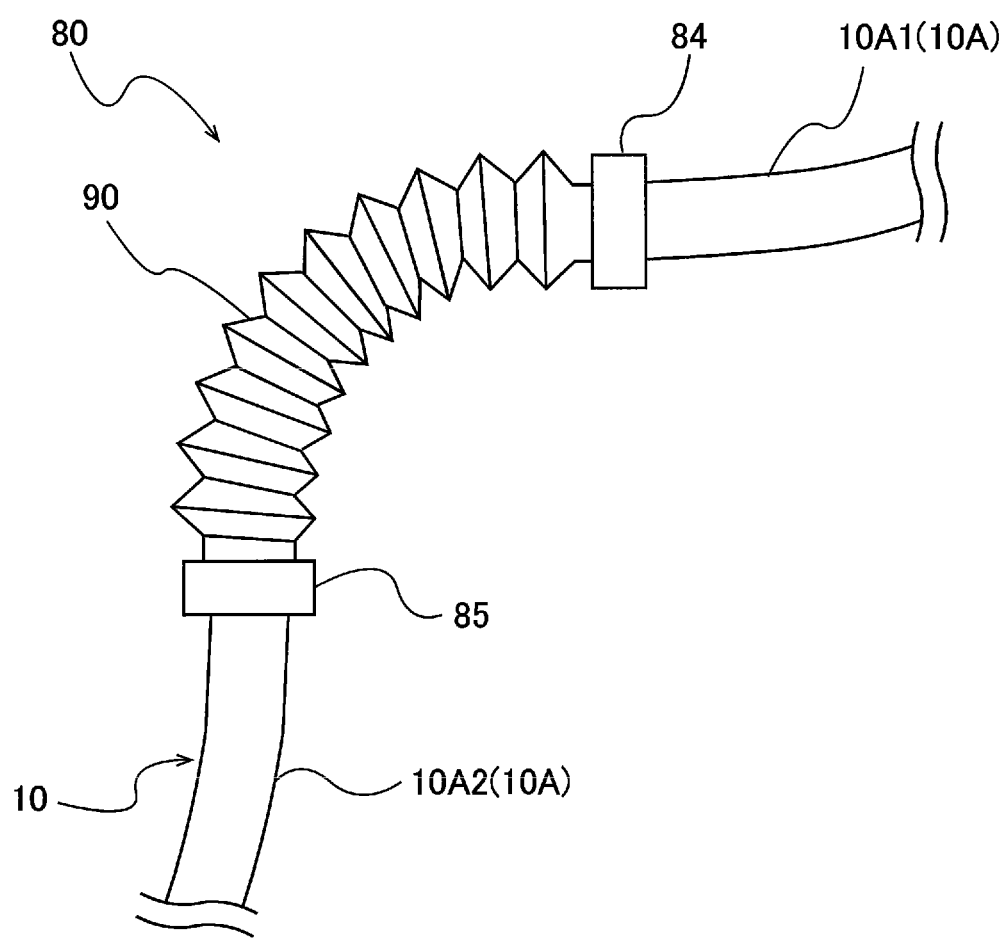
FIG. 20 is a schematic view showing still another example of the swivel joint mechanism.

FIG. 20 is a schematic view showing still another example of the swivel joint mechanism 80. The swivel joint 80 shown in FIG. 20 is constructed of a bellows pipe 90, and the first swivel joint 84 and the second swivel joint 85, which are connected to both ends of the bellows pipe 90, respectively. One end of the bellows pipe 90 is connected to the conduit 10A1 through the first swivel joint 84, and the other end of the bellows pipe 90 is connected to the conduit 10A2 through the second swivel joint 85. The bellows pipe 90 is also freely bendable. Therefore, this swivel joint mechanism 80 also make it possible to increase the degree of freedom of movement of the top drone 1 and each of the pump drones 6A, 6B that suspend the transport pipe 10, effectively preventing the transport pipe 10 to be contacted with objects existing between the demand area 200 and the disaster area 300.

Figure 21A:
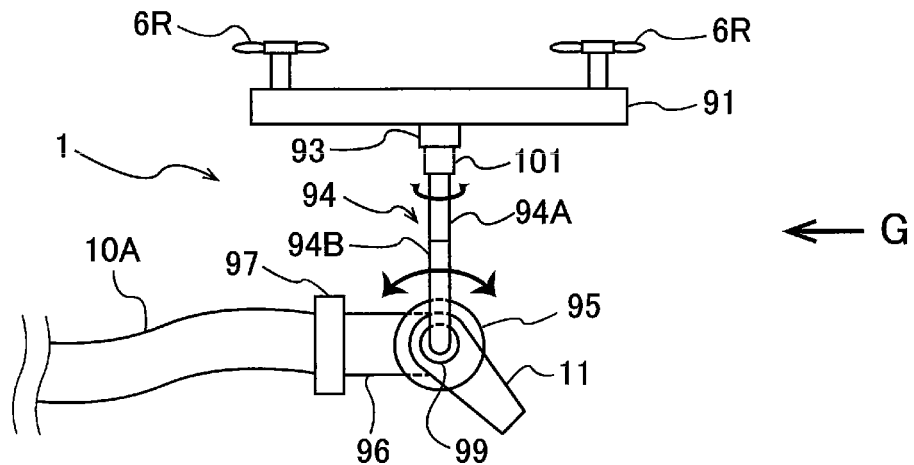
FIG. 21A is a side view schematically showing the top drone according to one embodiment.
Figure 21B:
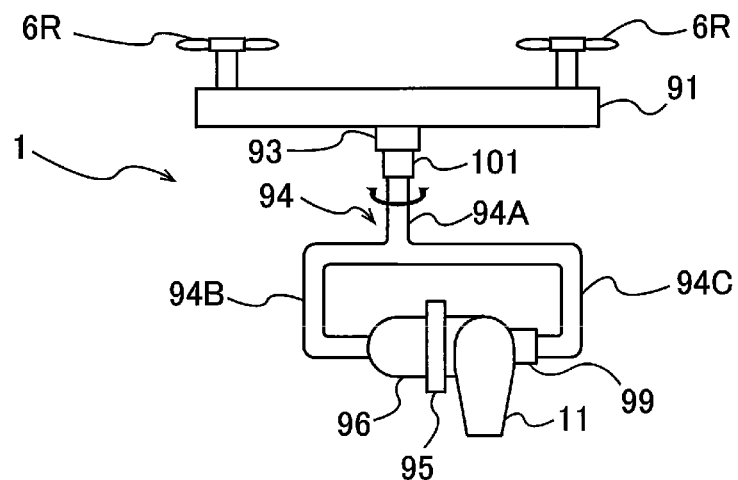
FIG. 21B is a view as viewed along arrow G-in FIG. 21A.
Figure 21C:
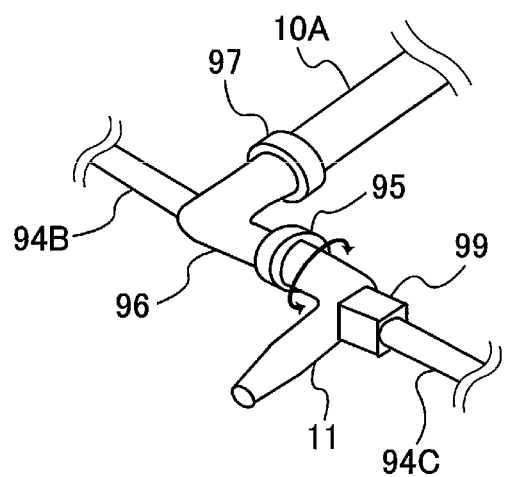
FIG. 21C is a perspective view schematically showing the nozzle shown in FIG. 21A.

FIGS. 21A to 21C are schematic views each showing the top drone 1 according to one embodiment. More specifically, FIG. 21A is a side view schematically showing the top drone 1 according to one embodiment, FIG. 21B is a view as viewed along arrow G-in FIG. 21A, and FIG. 21C is a perspective view schematically showing the nozzle 11 shown in FIG. 21A.

As shown in FIGS. 21A and 21B, the top drone 1 has a top drone body 91 to which the plurality of rotary blades 6R are fixed, a bearing 93 attached to a lower surface of the top drone body 91, and a nozzle rotation shaft 94 rotatably supported by the bearing 93. The nozzle rotation shaft 94 is constructed of a main shaft 94A rotatably supported by the bearing 93, and a first branch shaft 94B and a second branch shaft 94C each branching from the main shaft 94A. The first branch shaft 94B and the second branch shaft 94C have an approximate C-shape, respectively.

As shown in FIG. 21C, the nozzle 11 according to this embodiment has an approximate L-shape, and can be rotated about the nozzle rotation shaft 94. A terminal end of the nozzle 11 is coupled to one end of a short pipe 96, having an approximate L-shape, through the swivel joint 95. The other end of the short pipe 96 is coupled to a tip end of the conduit 10A, which is located at the uppermost side, through a swivel joint 97. In other words, the tip of the transport pipe 10 is coupled to the nozzle 11 through the swivel joint 97, the short pipe 96, and the swivel joint 95. A tip end of the nozzle 11 is configured as a jet port of water flowing through the transport pipe 10.

A tip end of the first branch shaft 94B is fixed to a bent portion of the short pipe 96. The second branch shaft 94C has a terminal end to which an actuator 99 for rotating the nozzle 11 through a swivel joint 95 is fixed. The actuator 99 is disposed between the terminal end of the second branch shaft 94C and a bent portion of the nozzle 11. In this embodiment, the actuator 99 is a motor. A rotation shaft (not shown) of the actuator 99 is fixed to the bent portion of the nozzle 11. When the actuator 99 is set in motion, the nozzle 11 is rotated through the swivel joint 95. In other words, the actuator 99 allows the tip of the nozzle 11 to pivot in the vertical direction. Therefore, a position of the tip of the nozzle 11 in the vertical direction can be changed in accordance with a position of the tank 301 (see FIG. 1) with respect to the top drone 1.

Figure 22:
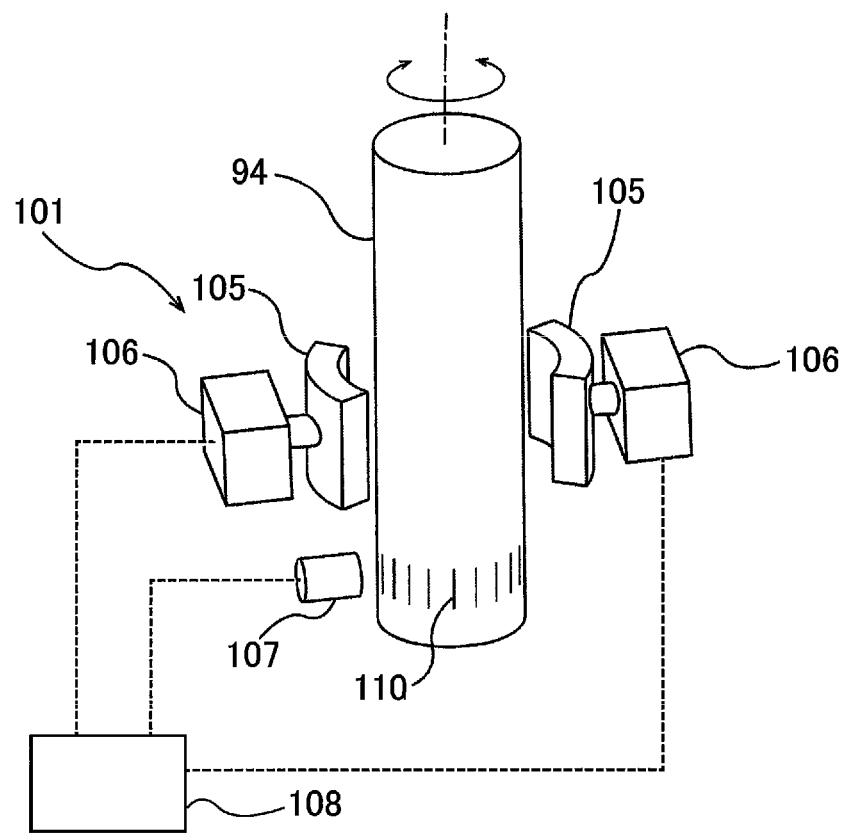
FIG. 22 is a perspective view schematically showing an example of the locking mechanism.

The top drone 1 preferably has a locking mechanism that restricts the rotation of the nozzle rotation shaft 94 relative to the top drone body 91. FIG. 22 is a perspective view schematically showing an example of the locking mechanism. The locking mechanism 101 shown in FIG. 22 can be used to prevent the rotational movement of the nozzle rotation shaft 94 relative to the top drone body 91. Therefore, the tip end of the nozzle 11 can be rotated horizontally when the top drone 1 is rotated horizontally while the locking mechanism 101 prevents the rotational movement of the nozzle rotation shaft 94 relative to the top drone body 91.

In this embodiment, the locking mechanism 101 is fixed to the bearing 93 (see FIG. 21A). The locking mechanism 101 is configured to hold (lock) the nozzle rotation shaft 94, thereby restricting the relative rotation of the nozzle rotation shaft 94 with respect to the top drone body 91.

The locking mechanism 101 is normally inactive. However, the locking mechanism 101 can be operated automatically or by remote control of a pilot to prevent the rotation of the nozzle rotation shaft 94. For example, when water is released from the top drone 1 into the tank 301, the locking mechanism 101 prevents the rotational movement of the nozzle rotation shaft 94 so that the tip end of the nozzle 11 remains with facing the tank 301. Next, the actuator 99 mentioned above is operated to adjust the position of the tip end of the nozzle 11 in the vertical direction such that the water jetted from the nozzle 11 is released into the tank 301.

Next, the specific configuration of the locking mechanism 101 will be described with reference to FIG. 22. As shown in FIG. 22, the locking mechanism 101 includes two brake pads 105 facing an outer circumferential surface of the nozzle rotation shaft 94, two actuators 106 coupled to the two brake pads 105 respectively, an angle detector 107 for detecting a rotation angle of the nozzle rotation shaft 94, and an actuator controller 108 that actuates the actuators 106 based on the rotation angle of the nozzle rotation shaft 94. In one embodiment, only one brake pad 105 and only one actuator 106 coupled to this brake pad 105 may be provided.

Each actuator 106 is configured to press the brake pads 105 against the outer peripheral surface of the nozzle rotation shaft 94. Configuration of the actuator 106 is not particularly limited, but for example, the actuator 106 can be constructed from a combination of a motor and a ball screw mechanism, an air cylinder, or the like. An arrangement of the two brake pads 105 is symmetrical around the nozzle rotation shaft 94. When the actuator 106 is set in motion, the brake pads 105 are pressed against the nozzle rotation shaft 94, thereby causing the nozzle rotation shaft 94 to be held by the brake pads 105. As a result, the nozzle rotation shaft 94, and the nozzle 11 coupled to this nozzle rotation shaft 94 are prevented from rotating relative to the top drone body 91.

A plurality of patterns 110 are formed at the outer circumference of the nozzle rotation shaft 94. These patterns 110 are arranged at equal intervals around a center of the nozzle rotation shaft 94. The angle detector 107 is disposed opposite to the patterns 110. The angle detector 107 is configured to guide light to the outer peripheral surface of the nozzle rotation shaft 94, and detect the rotation angle of the nozzle rotation shaft 94 based on reflected light from the patterns 110. An optical rotary encoder can be used for such an angle detector 107. The angle detector 107 is electrically connected to the actuator controller 108. The actuator controller 108 operates the actuator 106 based on the rotation angle of the nozzle rotation shaft 94 detected by the angle detector 107.

In one embodiment, the angle detector 107, the actuator controller 108, and the pattern 110 described above may be omitted. In this case, a pilot may remotely operate the locking mechanism 101, when the nozzle 11 is at a proper angle.

The locking mechanism 101 described with reference to FIG. 22 may be provided to each pump drone 6A, 6B to restrict the rotation of the above-described coupling shaft 37 or 43 (see FIGS. 2, 4, 5, 8, 9, and 13C). In this case, the locking mechanism 101 may be equipped to all pump drones 6A, 6B in the drone system 100, or only to some of the pump drones 6A, 6B.

Further, the balance mechanism 45 described with reference to FIGS. 15A and 15B may be provided in the top drone 1. In this case, each arm 47 to which the rotary blade 46 of the balance mechanism 45 is fixed is preferably fixed to a side of the top drone body 91.

In the embodiments described above, the power cable 5 is coupled to each of the drones 1, 6A, 6B through the universal joint 19. However, the present invention is not limited to this example. For example, the power cable 5 may be fixed to an outer surface of the conduit 10A.

Figure 23:
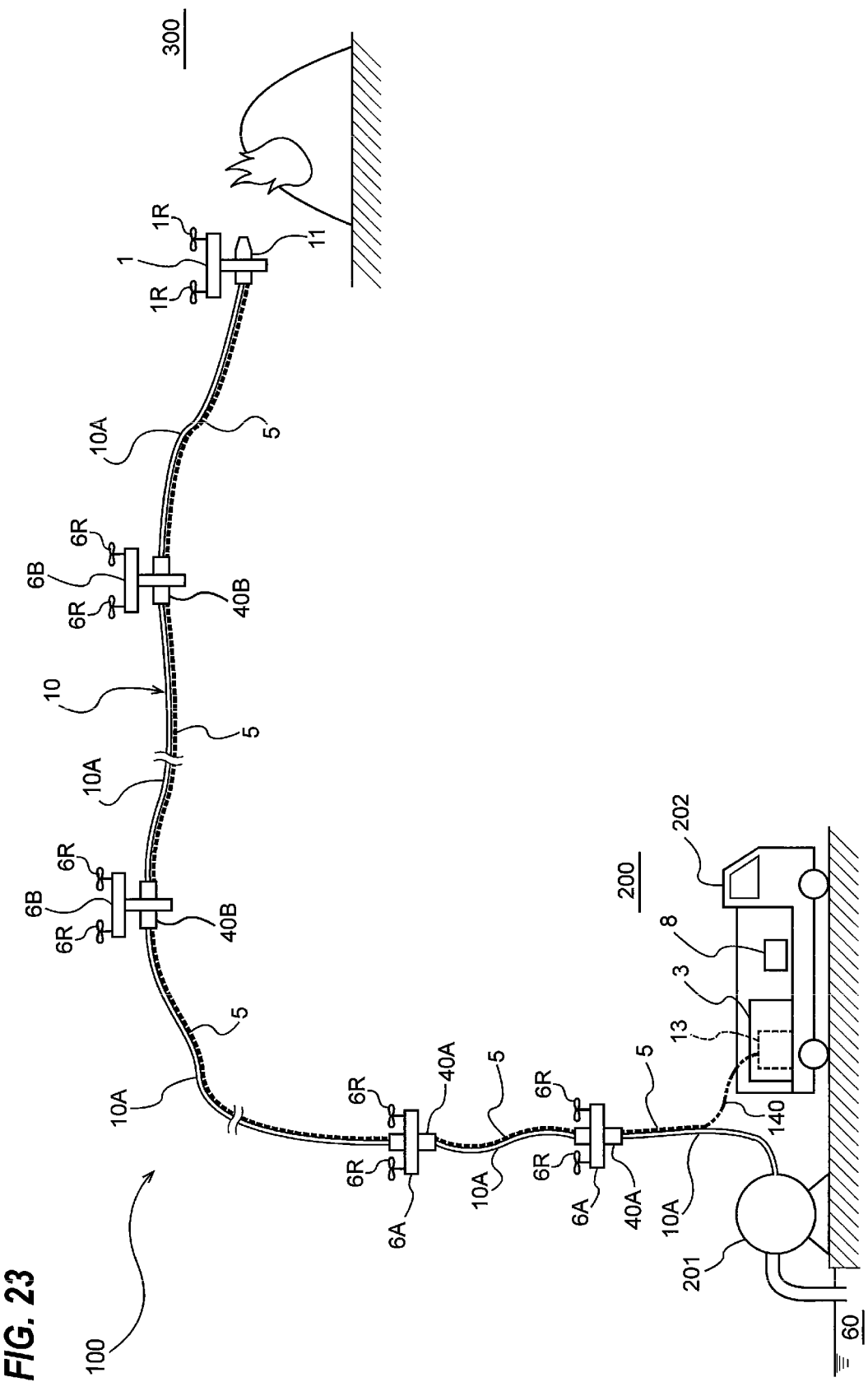
FIG. 23 is a schematic view showing an example of the drone system in which the transport pipe is formed by the conduits integrated with the power cable.

FIG. 23 is a schematic view showing an example of the drone system 100 in which the transport pipe 10 is formed by the conduits 10A integrated with the power cable 5. The drone system 100 shown in FIG. 23 is a drone system for transporting a firefighting fluid (e.g., water) from the remote area 200 to a wildfire occurrence site, which is an example of the demand area. Configuration of this system, which will not be particularly described, is the same as that of the above-described embodiments, and duplicate descriptions thereof are omitted.

As shown in FIG. 23, the power cables 5 are fixed to an outer surface of the transport pipe 10. More specifically, each power cable 5 is fixed to the outer surface of each conduit 10A. Therefore, the power cables 5 extend in unison with the transport pipe 10, effectively preventing the power cables 5 from becoming entangled in the transport pipe 10. This drone system 100 has a power line 140 extending from the power source 13 of the power supply unit 3, and the power cable 5 fixed to the conduit 10A, which is located at the lowermost side, is coupled to the power source 13 of the power supply unit 3 through the power line 140.

Figure 24:
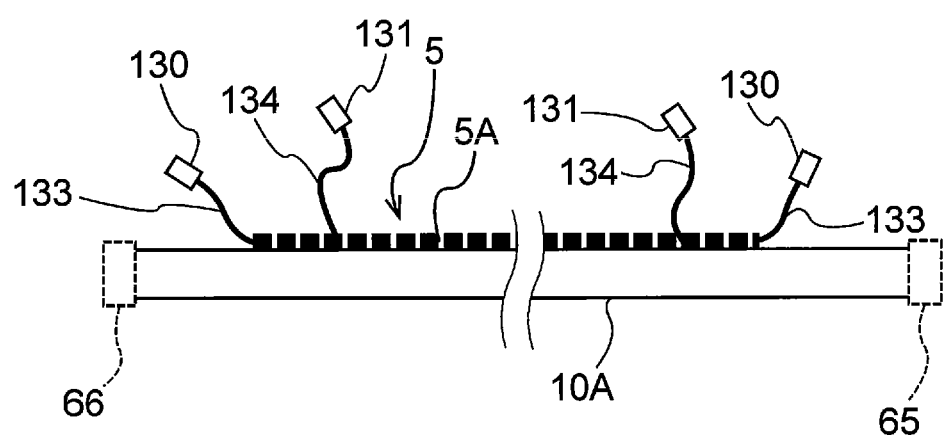
FIG. 24 is a schematic view showing an example of the conduit used in the drone system shown in FIG. 23.
Figure 25A:
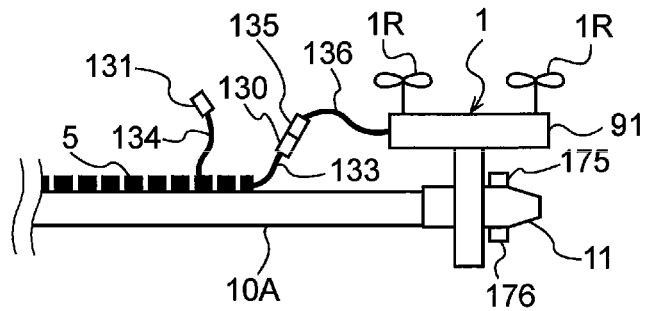
FIG. 25A is a schematic enlarged view showing the top drone shown in FIG. 23.
Figure 25B:
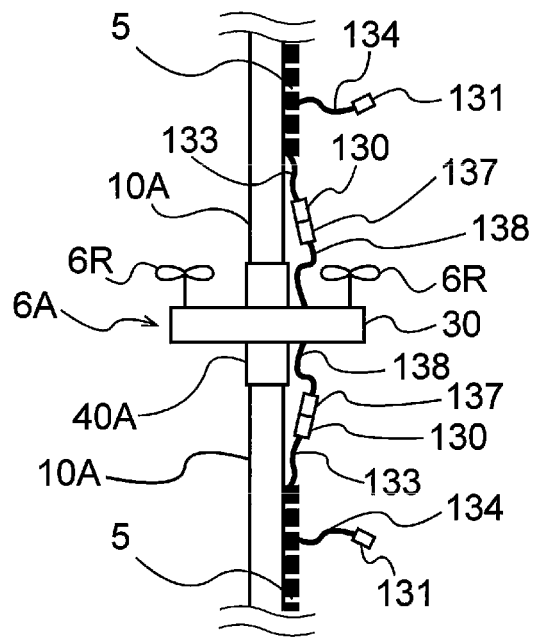
FIG. 25B is a schematic view showing the vertical pump drone shown in FIG. 23.
Figure 25C:
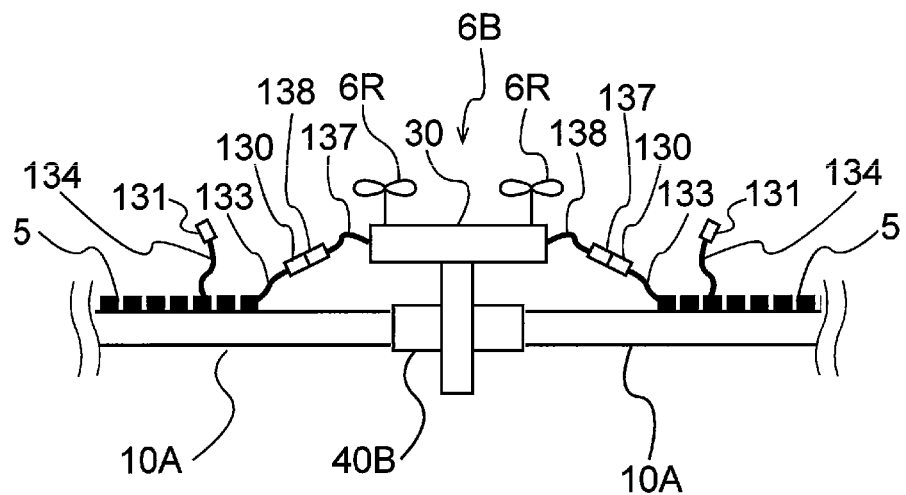
FIG. 25C is a schematic view showing the horizontal pump drone shown in FIG. 23.

FIG. 24 is a schematic view showing an example of the conduit 10A used in the drone system 100 shown in FIG. 23. FIG. 25A is a schematic view showing the top drone 1 shown in FIG. 23, FIG. 25B is a schematic view showing the vertical pump drone 6A shown in FIG. 23, and FIG. 25C is a schematic view showing the horizontal pump drone 6B shown in FIG. 23. In FIG. 24, as an example of a configuration of the two ends of the conduit 10A, the swivel joints 65, 66 for coupling the two ends of the conduit 10A to the inlet pipe 60 and the discharge pipe 62 of each pump drone 6A, 6B are illustrated as virtual lines (dotted lines). Each pump drone 6A, 6B is coupled in a chain-like manner by the conduit 10A shown in FIG. 24.

As shown in FIG. 24, the power cable 5 has a cable body 5A fixed to the outer surface of the conduit 10A, power lines 133 extending from both ends of the cable body 5A, respectively, and first cable-side connector 130 fixed to the end of each power line 133. The power cable 5 further has power lines 134 extending from the vicinity of both ends of the cable body 5A, respectively, and second cable-side connectors 131 fixed to the ends of the power lines 134. The power line 133 is electrically connected to the end of the cable body 5A, and the power line 134 is electrically connected to the middle of the cable body 5A.

As shown in FIG. 25A, the top drone 1 has a top-drone-side connector 135 that can be connected to the first cable-side connector 130 of the power cable 5. The top-drone-side connector 135 is fixed to an end of a power line 136 extending from the top drone body 91. Connection the top-drone-side connector 135 to the first cable-side connector 130 enables the top drone 1 to be electrically connected to the power cable 5. The electric power supplied from the power cable 5 to the top drone body 91 through the top-drone-side connector 135 and the power line 136 is used to operate the equipment mounted to the top drone 1, such as the rotary blades 1R and the actuator 99 (see FIG. 21C).

As shown in FIGS. 25B and 25C, the pump drones 6A and 6B each have two drone-side connectors 137 that can be connected to the first cable-side connector 130. Each drone-side connector 137 is fixed to an end of a power line 138 extending from the pump drone body 30. Connection the drone-side connector 137 to the first cable-side connector 130 enables each pump drone 6A, 6B to be electrically connected to the power cable 5. The electric power supplied from the power cable 5 to the drone body 30 of the pump drone 6A (or 6B) through the drone-side connector 137 and the power line 138 is used to operate the equipment mounted to the pump drone 6A (or 6B), such as the rotary blades 6R and the pump 40A (or 40B).

Figure 26:
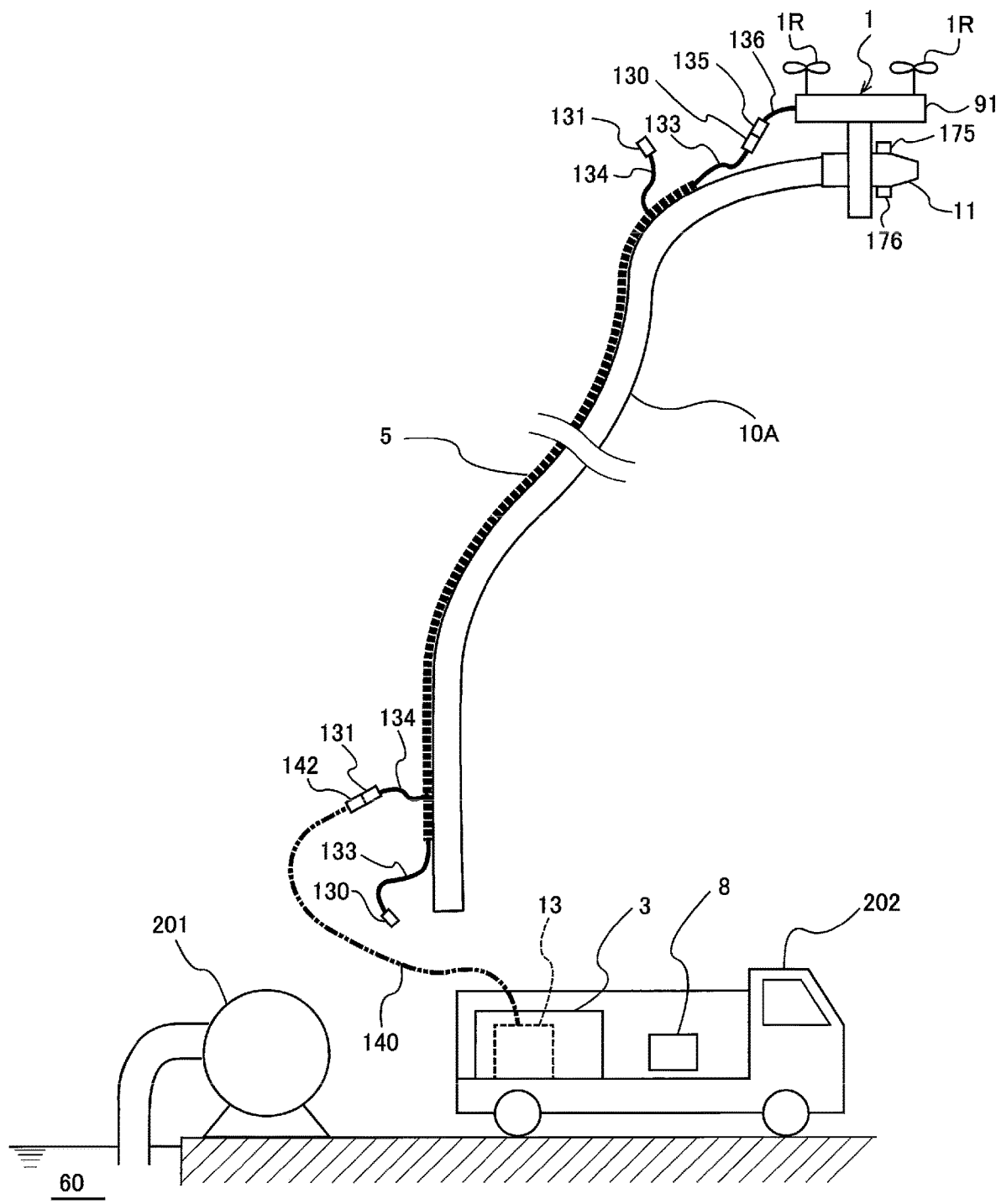
FIG. 26 is a schematic view showing a state in which the top drone is coupled to the power source of the power supply unit through the power cable.

Next, a method of constructing the drone system 100 will be described. FIG. 26 is a schematic view showing a state in which the top drone 1 is coupled to the power source 13 of the power supply unit 3 through the power cable 5. First, the top-drone-side connector 135 of the top drone 1 is connected to the first cable-side connector 130 provided to one end of the power cable 5. Next, the second cable-side connector 131 provided to the other end of the power cable 5 is connected to a power connector 142 fixed to an end of the power line 140 extending from the power source 13. With this operation, the top drone 1 is electrically connected to the power source 13, and thus the top drone 1 can fly by use of the power supplied from the power source 13. Next, as shown in FIG. 26, the top drone 1 is flown until the terminal end of the conduit 10A rises from the ground.

Figure 27A:
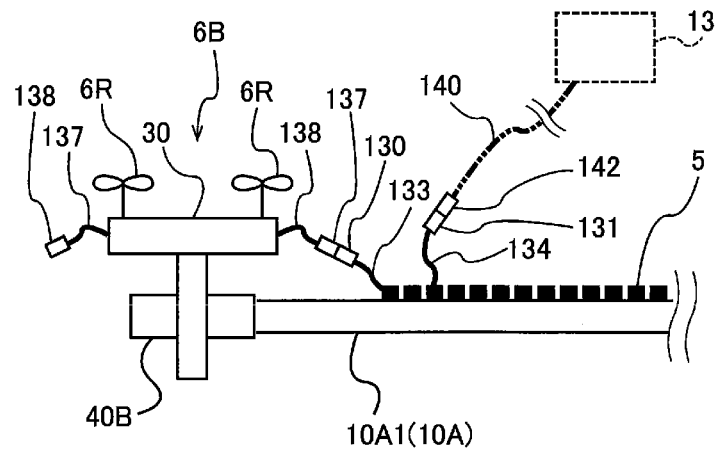
FIG. 27A is a schematic view showing a state in which the conduit and the power cable shown in FIG. 26 are coupled to the horizontal pump drone.
Figure 27B:
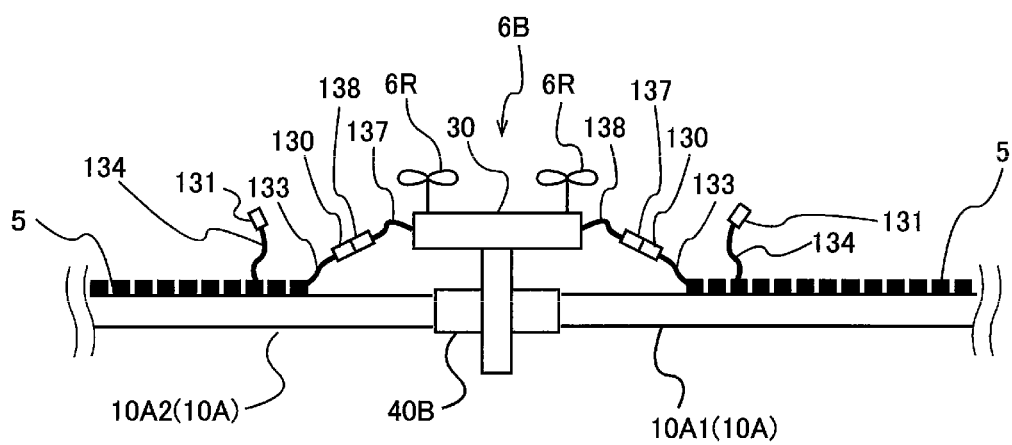
FIG. 27B is a schematic view showing a state in which next conduit and the power cable are coupled to the horizontal pump drone shown in FIG. 27A.
Figure 27C:
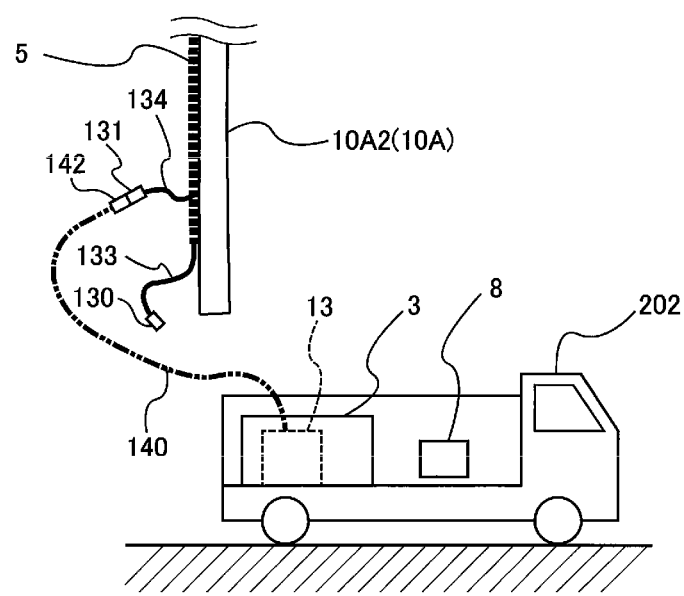
FIG. 27C is a schematic view showing a state in which the power cable fixed to the next conduit shown in FIG. 27B is coupled to the power source of the power supply unit.

FIG. 27A is a schematic view showing a state in which the conduit 10A and the power cable 5 shown in FIG. 26 are coupled to the horizontal pump drone 6B, FIG. 27B is a schematic view showing a state in which next conduit 10A and the power cable 5 are coupled to the horizontal pump drone 6B shown in FIG. 27A, and FIG. 27C is a schematic view showing a state in which the power cable 5 fixed to the next conduit 10A shown in FIG. 27B is coupled to the power source 13 of the power supply unit 3. In the following, a process of coupling the horizontal pump drone 6B to the adjacent conduit 10A and the power cable 5 will be described with reference to FIGS. 27A to 27C. A process of coupling the vertical pump drone 6A to the adjacent conduit 10A and the power cable 5 is the same as the process shown in FIGS. 27A to 27C, and duplicate explanations thereof are omitted.

As shown in FIG. 27A, a terminal end of the conduit 10A which has already coupled to the top drone 1 (hereinafter referred to as "conduit 10A1") is coupled to the discharge pipe 62 of the pump 40B of the horizontal pump drone 6B. In this operation, it is preferable to use the swivel joint 66 described above to couple the terminal end of the conduit 10A1 to the discharge pipe 62 of the pump 40B. Next, the first cable-side connector 130 provided to the other end of the power cable 5 is connected to one of the drone-side connectors 137 of the horizontal pump drone 6B.

Next, as shown in FIG. 27B, a tip end of the next conduit 10A (hereinafter referred to as "conduit 10A2") is coupled to the inlet pipe 60 of the pump 40B of the horizontal pump drone 6B. In this operation, it is preferable to use the swivel joint 65 described above to couple the tip end of the conduit 10A2 to the inlet pipe 60 of the pump 40B. Furthermore, the other of drone-side connectors 137 of the horizontal pump drone 6B is connected to the first cable-side connector 130 provided to one end of the power cable 5.

Next, the connection between the second cable-side connector 131 and the power connector 142 shown in FIG. 27A is disconnected, and the top drone 1 and the horizontal pump drone 6B are flown until a terminal end of the conduit 10A2 coupled to the horizontal pump drone 6B rises from the ground. In this operation, the supply of electric power from the power source 13 is stopped to the top drone 1 and the horizontal pump drone 6B. Accordingly, the top drone 1 and the horizontal pump drone 6B have a built-in battery (not shown), and the top drone 1 and the horizontal pump drone 6B fly using power stored in this battery.

Next, as shown in FIG. 27C, the second cable-side connector 131 provided to the other end of the power cable 5 is connected to the power connector 142 fixed to the end of the power line 140 extending from the power source 13. With this operation, the top drone 1 and the horizontal pump drone 6B are electrically connected to the power source 13, and thus the top drone 1 and the horizontal pump drone 6B can fly by use of the electric power supplied from the power source 13. It is preferable to charge the batteries mounted to the top drone 1 and the horizontal pump drone 6B, respectively, after the supply of electric power from the power source 13 has been started.

The drone system 100 is constructed by repeating the process shown in FIGS. 27A to 27C. Specifically, when coupling the adjacent pump drones 6A and 6B to each other, the next conduit 10A is first coupled to the pump drone 6A (or 6B) located at the lowest side. The next conduit 10A coupled to the pump drone 6A (or 6B), which is located at the lowermost side, corresponds to the conduit 10A2 described above, and the conduit 10A already coupled to the pump drone 6A (or 6B), which is located at the lowermost side, corresponds to the conduit 10A1 described above. One of the drone-side connectors 137 extending from the pump drone 6A (or 6B), which is located at the lowermost side, has been already connected to the first cable-side-connector 133 provided to the terminal end of the power cable 5 fixed to the conduit 10A1.

Next, the connection between the second cable-side connector 131 of the power cable 5 fixed to the conduit 10A1, and the power connector 140 is disconnected, and all drones 1, 6A, 6B are flown until the terminal end of the next conduit 10A2 rises from the ground. Then, the second cable-side connector 131 provided to the terminal end of the power cable 5 fixed to the next conduit 10A2 is connected to the power connector 140, and the power is supplied from the power source 13 to all drones 1, 6A, 6B. By repeating such processes, the drones 1, 6A, 6B of the drone system 100 can be coupled in a chain-like manner.

Figure 28A:
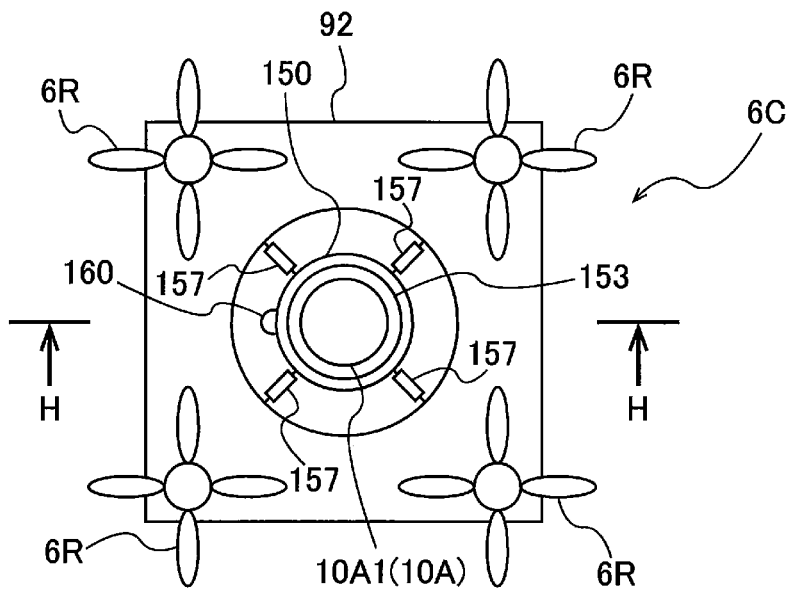
FIG. 28A is a side view of a coupling drone according to one embodiment.
Figure 28B:
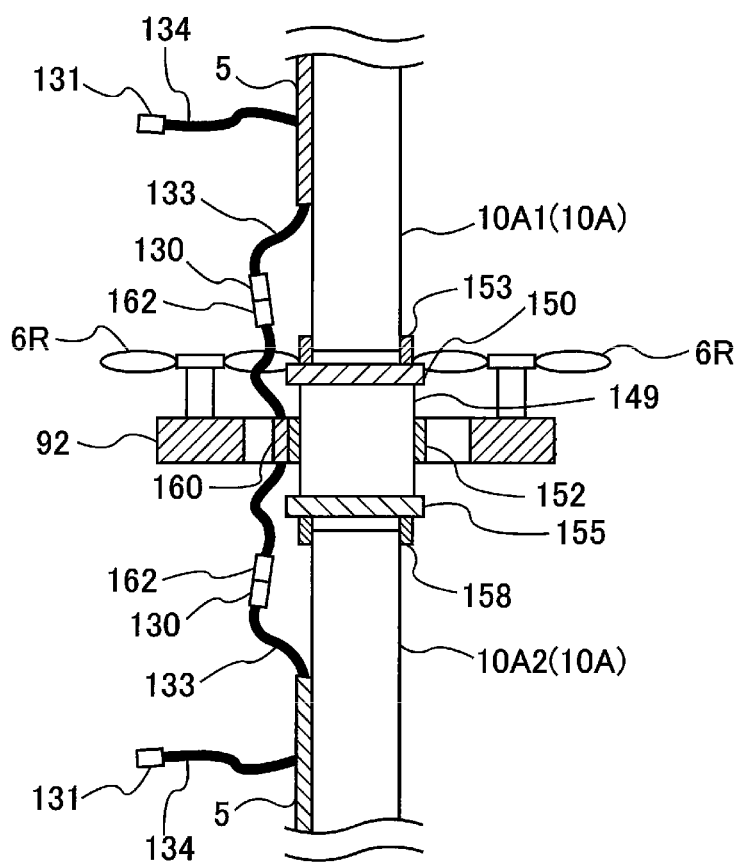
FIG. 28B is a cross-sectional view taken along line H-H in FIG. 28A.

FIG. 28A is a side view of a coupling drone according to one embodiment, and FIG. 28B is a cross-sectional view taken along line H-H in FIG. 28A. The coupling drone 6C shown in FIGS. 28A and 28B is a drone used to couple the adjacent conduits 10A (i.e., conduits 10A1 and 10A2) to each other. The coupling drone 6C does not have the above-described pump 40A (or 40B) for increasing the pressure of water flowing through the transport pipe 10.

The coupling drone 6C shown in FIGS. 28A and 28B has a coupling drone body 92 to which rotary blades 6R are fixed, a short pipe 149 disposed inside a through-hole formed in the coupling drone body 92, a sleeve 152 fixed to an outer surface of the short pipe 149, and a plurality of damper mechanisms 157 which couple a wall surface of the through-hole formed in the coupling drone body 92 and an outer surface of the sleeve 152 to each other. Swivel joints 150, 155 are provided at both ends of the short pipe 149, respectively. One-touch joints 153, 158 are fixed to the swivel joint 150, 155, respectively. The one conduit 10A1 is coupled to the swivel joint 150 through the one-touch joint 153, and the other conduit 10A2 is coupled to the swivel joint 155 through the one-touch joint 158.

Since the swivel joint 150 is rotatable with respect to the short pipe 149, the swivel joint 150 allows the conduit 10A1 to be rotated with respect to the short pipe 149, which is coupled to the coupling drone body 92 through the plurality of damper mechanisms 157 and sleeves 152. Similarly, since the swivel joint 155 is rotatable with respect to the short pipe 149, the swivel joint 155 allows the conduit 10A2 to be rotated with respect to the short pipe 149, which is coupled to the coupling drone body 92 through the plurality of damper mechanisms 157 and the sleeve 152.

The coupling drone 6C further has a power line 160 that can be coupled to the power cable 5. The power line 160 of the coupling drone 6C shown in FIGS. 28A and 28B is fixed to the outer surface of the sleeve 152. At both ends of the power line 160, coupling-drone-side connectors 162 are disposed respectively, each of which can be connected to the first cable-side connector 130 of the power cable 5 fixed to the outer surface of the conduit 10A. The electric power supplied from the power cable 5 to the connected drone 6C through the coupling-drone-side connector 162 and the power line 160 is used to operate the equipment mounted to the coupling drone 6C, such as the rotary blades 6R.

Figure 29:
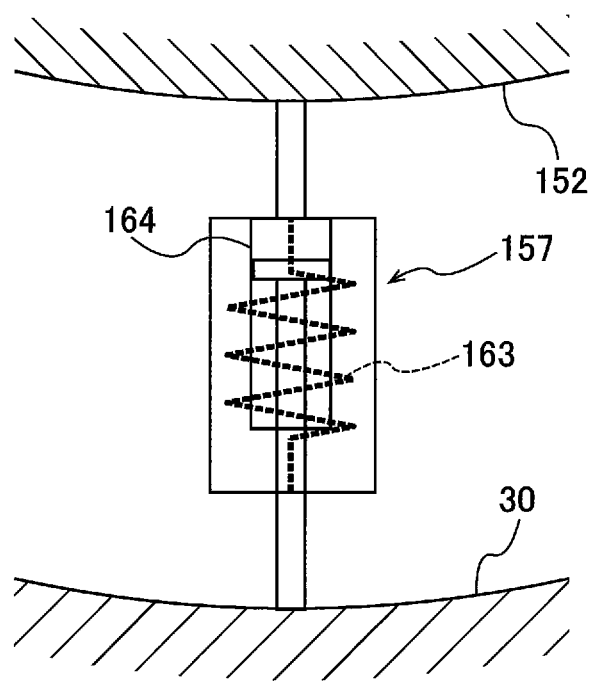
FIG. 29 is a schematic view showing the damper mechanism shown in FIG. 28A.

FIG. 29 is a schematic view showing the damper mechanism 157 shown in FIG. 28A. The damper mechanism 157 shown in FIG. 29 is constructed of a combination of a spring 163 and a piston-cylinder mechanism 164. In FIG. 29, the spring 163 is illustrated by a dotted line. Coupling the short pipe 149 to the coupling drone body 92 through the plurality of damper mechanisms 157 allows the short pipe 149 to be moved with respect to the coupling drone body 92 in a horizontal direction.

Coupling the adjacent conduits 10A1, 10A2 by use of the coupling drone 6C having such configuration enables the degree of freedom of operation of the coupling drone 6C with respect to the transport pipe 10 to be increased. As a result, the top drone 1 can reach the demand area 300 even in the presence of various obstacles (e.g., natural objects such as trees, rocks, cliffs, and mountains, and man-made objects such as houses, buildings, bridges, and power lines) between the remote area 200 and the demand area 300.

Figure 30A:
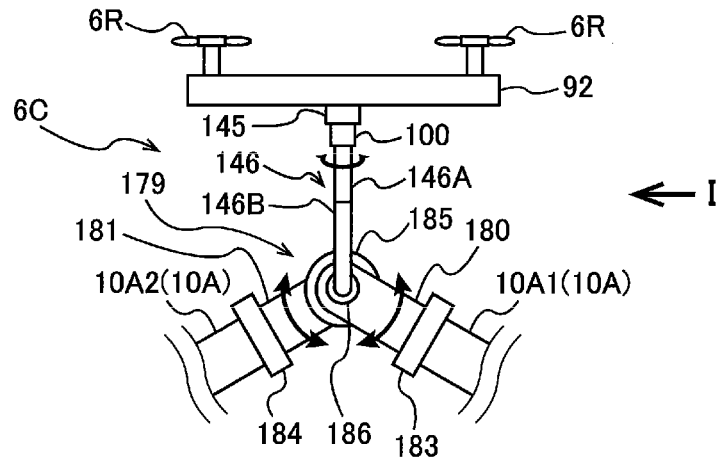
FIG. 30A is a side view schematically showing the coupling drone according to another embodiment.
Figure 30B:
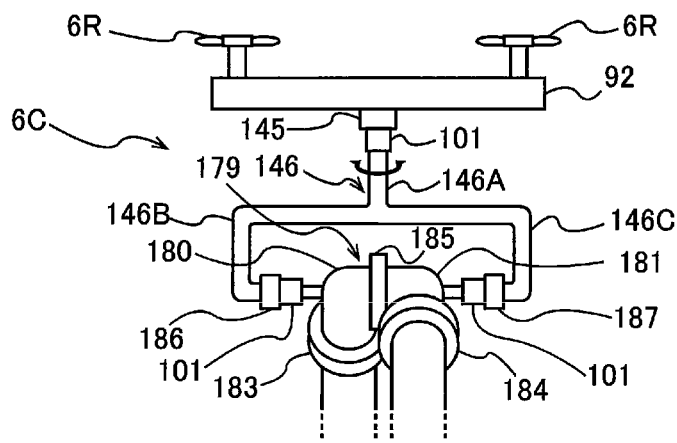
FIG. 30B is a view as viewed along arrow I in FIG. 30A.
Figure 30C:
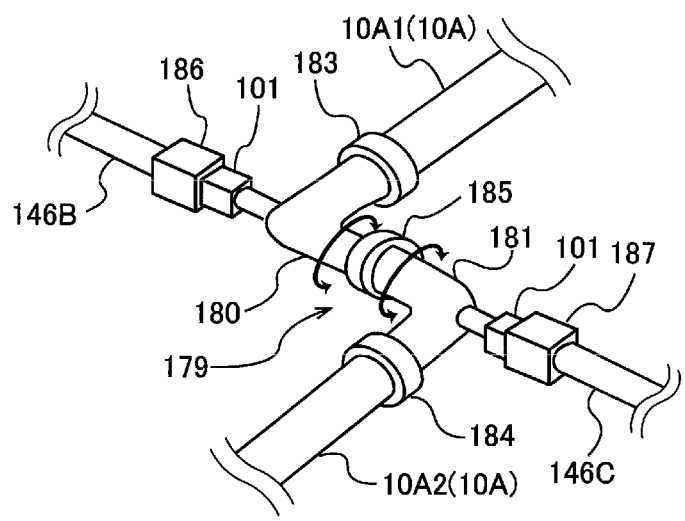
FIG. 30C is a perspective view schematically showing a coupling pipe shown in FIG. 30A.

FIGS. 30A to 30C are schematic views, each showing the coupling drone 6C according to another embodiment. More specifically, FIG. 30A is a side view schematically showing the coupling drone 6C according to another embodiment, FIG. 30B is a view as viewed along arrow I in FIG. 30A, and FIG. 30C is a perspective view schematically showing a coupling pipe shown in FIG. 30A.

The coupling drone 6C shown in FIGS. 30A to 30C is also a drone used to couple the adjacent conduits 10A (i.e., conduits 10A1 and 10A2) to each other. Therefore, the coupling drone 6C does not have the above-described pump 40A (or 40B) for increasing the pressure of water flowing through the transport pipe 10.

The coupling drone 6C shown in FIGS. 30A and 30B has a coupling drone body 92 to which a plurality of rotor blades 6R are fixed, a bearing 145 attached to the lower surface of the coupling drone body 92, and a support shaft 146 rotatably supported by the bearing 145. The support shaft 146 serves as a shaft for supporting a coupling pipe 179 which is disposed between the adjacent conduits 10A1 and 10A2. The support shaft 146 is constructed of a main shaft 146A that is rotatably supported by the bearing 145, and a first branch shaft 146B and a second branch shaft 146C that branch off from the main shaft 146A. The first branch shaft 146B and the second branch shaft 146C have an approximate C shape, respectively.

As shown in FIG. 30C, the coupling pipe 179 has a first bent pipe 180, and a second bent pipe 181, each of which is bent in an approximate L-shape, and a swivel joint 185 coupling the first bent pipe 180 and the second bent pipe 181 to each other. A swivel joint 183 is fixed to a tip end of the first bent pipe 180, and the first bent pipe 180 of the coupling pipe 179 is coupled to the conduit 10A1 through the swivel joint 183. The swivel joint 183 allows the conduit 10A1 to be rotated with respect to the first bent pipe 180. Similarly, a swivel joint 184 is fixed to a tip end of the second bent pipe 181, and the second bent pipe 181 of the coupling pipe 179 is coupled to the conduit 10A2 through the swivel joint 184. The swivel joint 184 allows the conduit 10A2 to be rotated with respect to the second bent pipe 180.

The swivel joint 185 allows the second bent pipe 181 (or the first bent pipe 180) to be rotated with respect to the first bent pipe 180 (or the second bent pipe 181) in the vertical direction. More specifically, when the coupling drone body 92 of the coupling drone 6C is flying in a horizontal posture (see FIG. 30A), the swivel joint 185 allows the first bent pipe 180 (or the second bent pipe 181) to rotate in the vertical direction with respect to the second bent pipe 181 (or the first bent pipe 180).

In this embodiment, an actuator 186 for rotating the first bent pipe 180 with respect to the second bent pipe 181 is fixed to a terminal end of the first branch shaft 146B, and a rotation shaft of the actuator 186 is fixed to a bent portion of the first bent pipe 180. Similarly, an actuator 187 for rotating the second bent pipe 181 with respect to the first bent pipe 180 is fixed to a terminal end of the second branching shaft 146C, and a rotation shaft of the actuator 187 is fixed to the bent portion of the second bent pipe 181. These actuators 186, 187 are operated independently by the controller 8 (see FIG. 1). Therefore, an angle of the second bent pipe 181 (or the first bent pipe 180) with respect to the first bent pipe 180 (or the second bent pipe 181) in the vertical direction can be freely changed.

Figure 31:
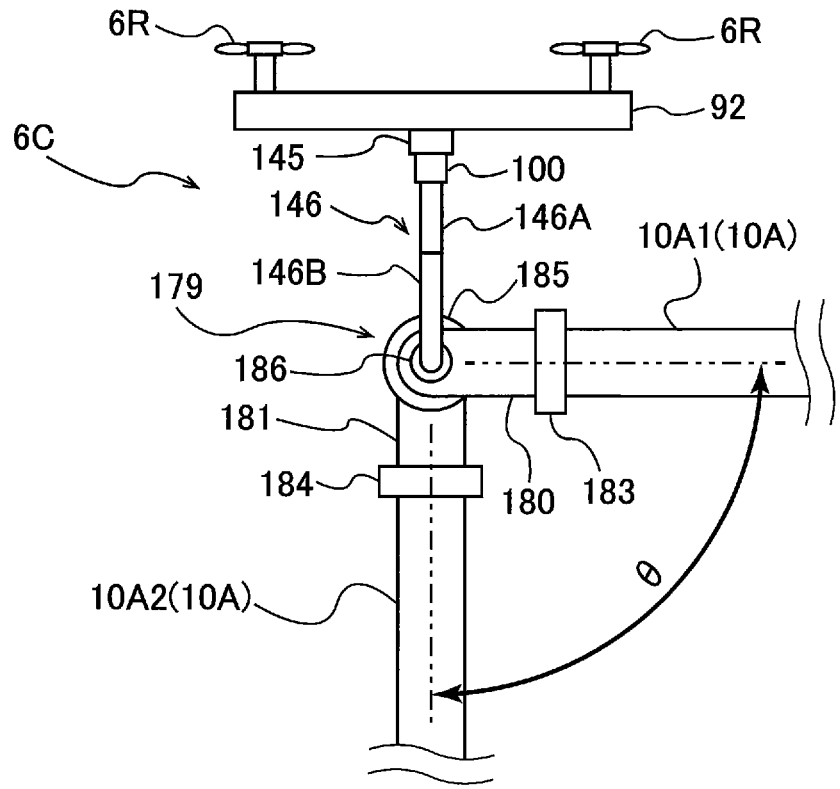
FIG. 31 is a schematic view showing a state in which adjacent conduits are coupled at right angle by the coupling drone shown in FIGS. 30A to 30C.

Coupling the conduits 10A1 and 10A2 by use of the coupling drone 6C enables the transport pipe 10 to be bent at a desired angle. In other words, using the coupling drone 6C as a fulcrum, the transport pipe 10 can be bent in the vertical direction at the desired angle. For example, as shown in FIG. 31, the transport pipe 10 can be bent at a right angle (i.e., θ=90°) in the vertical direction with the coupling drone 6C as the fulcrum. As a result, contact of the transport pipe 10 with objects existing between the demand area 200 and the disaster area 300 can be effectively prevented.

As shown in FIGS. 30B and 30C, the coupling drone 6C preferably has brake mechanisms 101 for preventing the rotational shafts of the actuators 186 and 187, respectively, from rotating. The brake mechanisms 101 shown in FIGS. 30B and 30C have the same configuration as the brake mechanism 101 described with reference to FIG. 22. These brake mechanisms 101 can prevent the first bent pipe 180 (or the second bent pipe 181) from unintentionally rotating with respect to the second bent pipe 181 (the first bent pipe 180). In one embodiment, the coupling drone 6C may have only one of the actuators 186 and 187.

Figure 32:
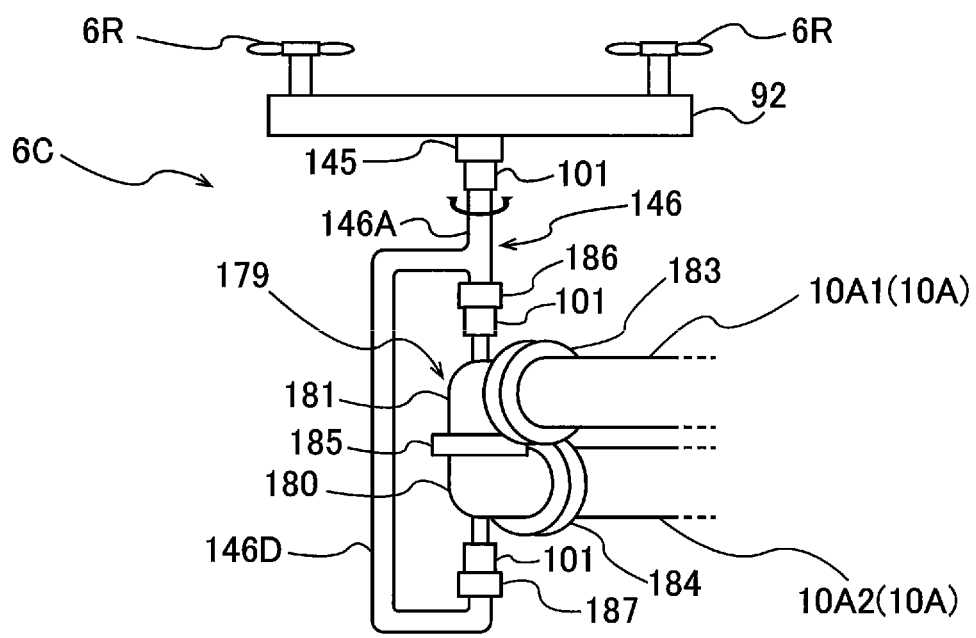
FIG. 32 is a side view schematically showing the coupling drone according to still another embodiment.

FIG. 32 is a side view schematically showing the coupling drone 6C according to still another embodiment. The coupling drone 6C shown in FIG. 32 corresponds to a modified example of the coupling drone 6C shown in FIGS. 30A to 30C. Configuration of this embodiment, which will not be specifically described, is the same as that of the coupling drone 6C shown in FIGS. 30A to 30C, and duplicate descriptions thereof will be omitted.

The coupling drone 6C shown in FIG. 32 also has the swivel joint 185 for coupling the first bent pipe 180 and the second bent pipe 181 to each other. However, this swivel joint 185 allows the second bent pipe 181 (or the first bent pipe 180) to be rotated with respect to the first bent pipe 180 (or the second bent pipe 181) in the horizontal direction. More specifically, when the coupling drone body 92 of the coupling drone 6C is flying in a horizontal posture, the swivel joint 185 allows the first bent pipe 180 (or the second bent pipe 181) to rotate in a horizontal direction with respect to the second bent pipe 181 (or the first bent pipe 180).

The support shaft 146 of the coupling drone 6C shown in FIG. 32 is constructed of a main shaft 146A rotatably supported by the bearing 145, and a frame 146D connected to a terminal end of the main shaft 146A. The frame 146D has an approximate C-shape, and the actuators 186 and 187 described above are fixed to both ends of the frame 146D, respectively. The controller 8 (see FIG. 1) can operate these actuators 186, 187 independently to thereby change freely a horizontal angle of the second bent pipe 181 (or the first bent pipe 180) with respect to the first bent pipe 180 (or the second bent pipe 181). As a result, the transport pipe 10 can be bent in the horizontal direction at a desired angle using the coupling drone 6C as a fulcrum, and thus contact of the transport pipe 10 with objects existing between the demand area 200 and the disaster area 300 can be effectively prevented.

As shown in FIGS. 25A and 26, the top drone 1 may have an imaging device 175 and an infrared camera 176 fixed to the nozzle 11. In one embodiment, the top drone 1 may have either the imaging device 175 or the infrared camera 176.

The imaging device 175 is, for example, a video camera, and images acquired by the imaging device 175 are transmitted to the controller 8 (see FIGS. 1 and 23). The controller 8 has a monitor (not shown), and an operator can check the images acquired by the imaging device 175 through the monitor. Therefore, the posture of the top drone 1 and the direction of the nozzles 11 can be adjusted based on the images acquired by the imaging device 175 to reliably release water into the tank 301 or the fire site.

Further, from images acquired by the infrared camera 176, the hottest part of the fire site can be confirmed. Therefore, the posture of the top drone 1 and the direction of the nozzle 11 can be adjusted based on the images acquired by the infrared camera 176 to thereby extinguish the fire quickly. In one embodiment, based on the images acquired by the infrared camera 176, it may be confirmed whether or not the fire has been extinguished.

In the embodiments described above, the drone system 100 which can continuously supply water from the remote area 200 to the tank 301 in the disaster area 300, or to the wildfire site, has been described. However, the present invention is not limited to these embodiments. For example, the drone system 100 may be used to extinguish a fire that has occurred in an urban area. In this case, if the top drone 1 has an imaging device 175 fixed to the nozzle 11, the top drone 1 can be quickly guided to the fire site. In particular, in a case where the fire occurs inside a high-rise construction, such as a building, the top drone 1, which is the unmanned mobile, can easily reach the interior of the high-rise building. Alternatively, if a fire occurs in a ship sailing at sea, the drone system 100 described above can be used to perform fire-fighting activities on the ship.

The components of the drone system 100, such as the top drone 1, the pump drones 6A, 6B, and the conduits 10A, may be stored in the fire station. In this case, the drone system 100 can be constructed in the fire station to supply firefighting fluid from the fire station to the fire site.

In one embodiment, the drone system 100 described above may be used to supply a liquid different from water, such as liquid fuel, to the remote area 300. For example, the drone system 100 may be used to supply water or liquid fuel to a ship anchored at sea. In this case, the ship corresponds to the demand area 300.

Figure 33:
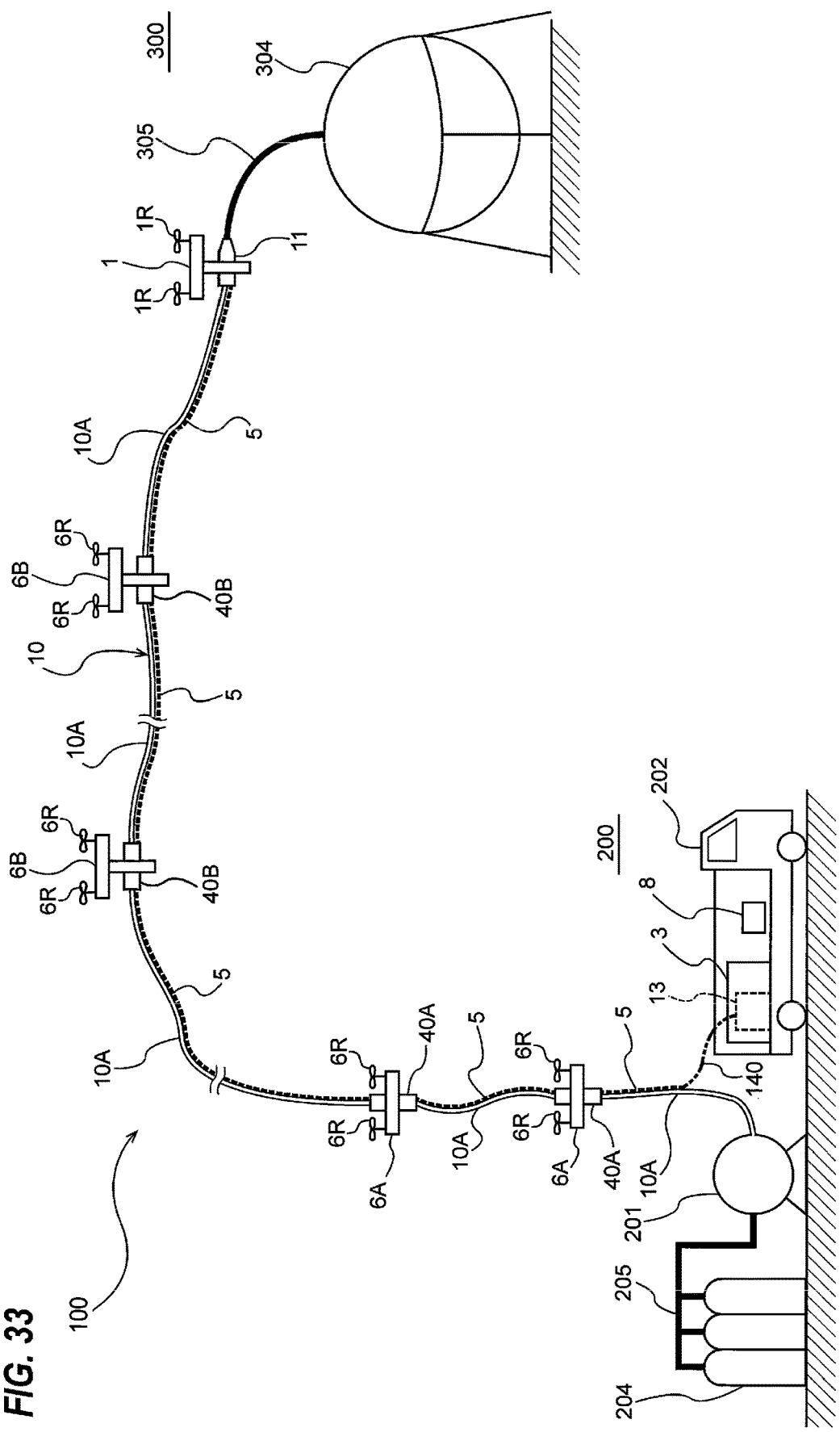
FIG. 33 is a view schematically showing the drone system for supplying fuel gas from the remote area to a gas tank located in a disaster area.

Further, the drone system 100 described above may be used to transport gas from the remote area 200 to the demand area 300. FIG. 33 is a view schematically showing the drone system 100 for supplying fuel gas, such as propane gas, or hydrogen gas, from the remote area 200 to a gas tank 304 located in a disaster area, which is an example of the demand area 300.

The drone system 100 shown in FIG. 33 is different from the embodiments described above only in that the pump device 201 located at the remote area 200 is provided for pumping fuel gas, and the nozzle 11 of the top drone 1 is coupled to a gas tank 304 located at the disaster area 300. The inlet pipe of the pump device 201 is coupled to a group of gas cylinders 204 filled with fuel gas through a pipe 205. Valves and pressure regulators (not shown) are arranged in the pipe 205, and fuel gas having a desired pressure is supplied from the group of gas cylinders 204 to the pump device 201 through the pipe 205. The fuel gas supplied to the pump device 201 is supplied from the pump device 201 to the nozzle 11 of the top drone 1 through the transport pipe 10 in which the pumps 40A, 40B of the plurality of pump drones 6A, 6B are arranged. The nozzle 11 is coupled to the gas tank 304 through a coupling pipe 305. The fuel gas that has reached the nozzle 11 is filled into the gas tank 304 through the coupling pipe 305. With this operation, the fuel gas can be continuously supplied to the disaster area 300.

A device for increasing a pressure of gas is typically referred to as a compressor. As shown in FIG. 33, the drone system 100 may be used to supply gas from the remote area 200 to the disaster area (demand area) 300. For this purpose, the pumps 40A, 40B of the pump drones 6A, 6B are defined herein as including a compressor. Similarly, the pump device 201 located at the remote area 200 is also defined as including a compressor.

Figure 34:
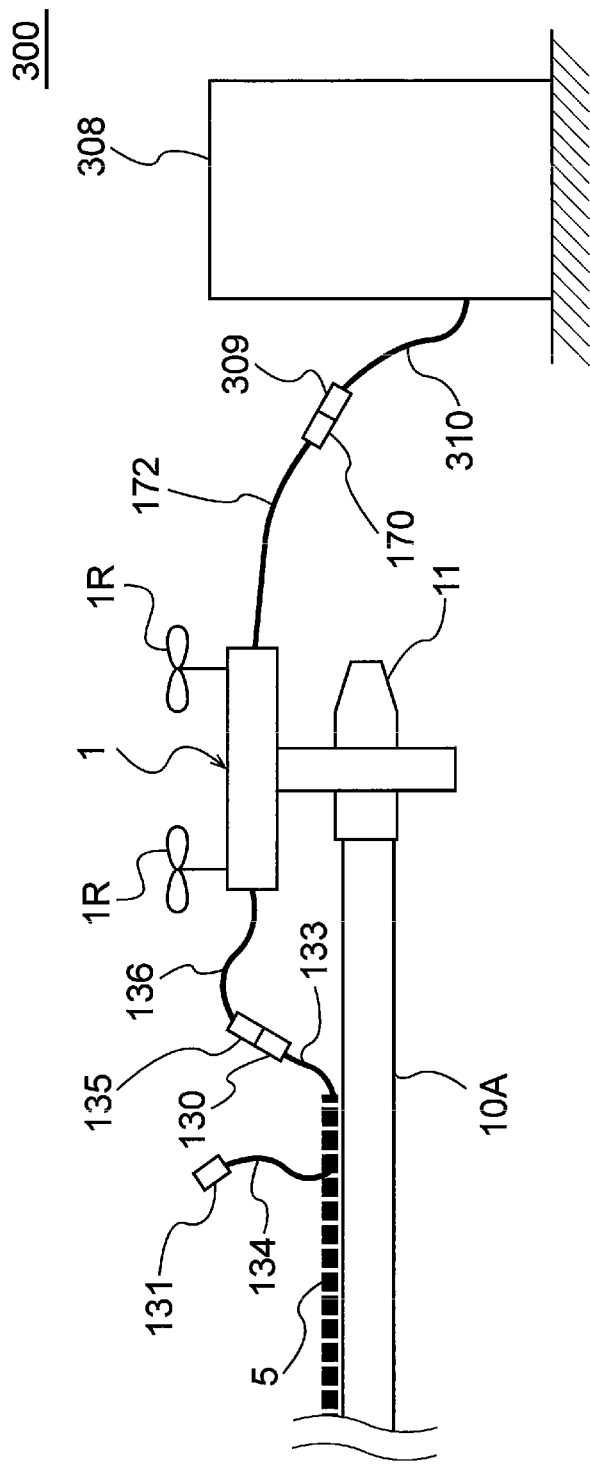
FIG. 34 is a schematic view showing the top drone for suppling electric power to the demand area.

FIG. 34 is a schematic view showing the top drone 1 for suppling electric power to the demand area (e.g., disaster area) 300. As shown in FIG. 34, the top drone 1 may have a power line 172 extending from the top drone body 91 of the top drone 1, and a connector 170 provided at a tip end of the power line 172. The connector 170 is coupled to a connector 309 of a power line 310 extending from a battery 308 located in the demand area (e.g., disaster area) 300, so that the power supplied to the top drone 1 from the power cable 5 can be stored in the battery 308. Thus, power can be continuously supplied to the demand area 300.

In the embodiments described above, the plurality of drones 1, 6A, 6B are always in flight, but the present invention is not limited to these embodiments. For example, at least one of the plurality of drones 1, 6A, 6B of the drone system 100 may be landed between the remote area 200 and the demand area 300. In this case, it is preferable to provide dedicated platforms (not shown) on which the drones 1, 6A, 6B to be landed can be placed. When at least one of the plurality of drones 1, 6A, 6B is landed, an amount of power consumed by the drone system 100 in its entirety can be reduced.

Further, in order to reduce the power consumption of the plurality of drones 1, 6A, 6B, the drone system 100 may have auxiliary aircraft (not shown), such as balloon, and airship, coupled to at least one of the plurality of conduits 10A. In other words, the drone system 100 may have the plurality of auxiliary aircrafts coupled to some or all of the plurality of conduits 10A, respectively, or the single auxiliary aircraft coupled to the single conduit 10A. The auxiliary aircraft has a gas bag, which can be filled with a gas lighter than air to obtain buoyancy. From the viewpoint of significantly reducing the power consumption of the plurality of drones 1, 6A, 6B, the auxiliary aircraft is preferably balloon that does not have a propulsion system that requires electric power. From the viewpoint of controlling and maintaining the aerial attitude of each conduit 10A (i.e., transport pipe 10) while reducing the power consumption of the plurality of drones 1, 6A, 6B, the auxiliary aircraft is preferably small airship equipped with a propulsion device which can be controlled by the controller 8, and can operate with less power.

For the same reason, the drone system 100 may have auxiliary aircraft (not shown), such as balloon, and airship, coupled to at least one of the plurality of power cables 5. The drone system 100 may have both auxiliary aircraft coupled to at least one conduit 10A, and auxiliary aircraft coupled to at least one power cable 5. When the drone system 100 has the plurality of auxiliary aircrafts, balloons may be used for some of the auxiliary aircrafts, and (small) airships may be used for the remaining auxiliary aircrafts.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a drone system that uses a plurality of drones to transport liquids (e.g., water, firefighting fluids, or liquid fuels) or gas (e.g., fuel gas, such as propane gas, and hydrogen gas) from a remote area to a demand area.

REFERENCE SIGNS LIST 1 top drone
1R rotary blade
3 power supply unit
5 power cable
6A, 6B pump drone
6C coupling drone
6R rotary blade 8 controller
10 transport pipe
10A conduit
11 nozzle
13 power source
19 universal joint
30 drone body
30B first structure
30C second structure
33 arm
34, 44, 72, 93 bearing
35 coupling mechanism
37, 43 coupling shaft
38 rotating member
39 support structure
40A, 40B pump
45 balance mechanism
46 rotary blade
47 arm
50 post member
52, 53 plate member
55, 55A, 55B spring member
60 inlet pipe
62 discharge pipe
65, 66, 75, 76, 84, 85, 86, 95, 97, 150, 155 swivel joint
70 disk
74, 94 rotation shaft
80 swivel joint mechanism
81, 82 bent pipe
87 coil pipe
88 pump body
90 bellows pipe
91 top drone body
92 coupling drone body
99, 145, 186, 187 actuator
100 drone system
101 locking mechanism
130, 131, 135, 137, 142, 162, 163, 170 connector
133, 134, 136, 138, 140, 164, 165, 172 power line
149 short pipe
152 sleeve
153, 158 one-touch joint
157 damper mechanism
175 imaging device
176 infrared camera
179 coupling pipe
200 remote area
201 pump device (supply unit)
202 vehicle
300 demand area (disaster area)
301 tank
304 gas tank

The invention claimed is:

1. A drone system for suppling liquid or gas from a remote area to a demand area, comprising:
a transport pipe for flowing the liquid or the gas;
a pump device located at the remote area to supply the liquid or the gas to the transport pipe;
a top drone for holding a nozzle coupled to a tip end of the transport pipe;
a plurality of pump drones which are located in the middle of the transport pipe, and each of which incorporates a pump for increasing a pressure of the liquid or the gas flowing through the transport pipe; and
a power supply unit for suppling a power to the top drone and the plurality of pump drones through power cables;
wherein the transport pipe is formed by coupling a plurality of conduits through pumps of the pump drones,
each of the pump drones has:
a pump drone body; and
a coupling mechanism for tiltably and rotatably coupling the pump to the pump drone body, and
wherein the coupling mechanism includes:
a coupling shaft fixed to the pump; and
a rotating member for rotatably supporting the pump around the coupling shaft; and
the rotating member is rotatably supported by the pump drone body.

2. The drone system according to claim 1, wherein an inlet pipe and a discharge pipe of the pump are coupled to the conduits through swivel joints, respectively.

* * * * *